(12) United States Patent
Kazi et al.

(10) Patent No.: US 7,298,385 B2
(45) Date of Patent: Nov. 20, 2007

(54) METHOD AND DEVICE FOR VISUALIZING COMPUTER-GENERATED INFORMATIONS

(75) Inventors: Arif Kazi, Augsburg (DE); Bahadir Kuepeli, Augsburg (DE); Rainer Bischoff, Augsburg (DE)

(73) Assignee: KUKA Roboter GmbH (DE)

( * ) Notice: Subject to any disclaimer, the term of this patent is extended or adjusted under 35 U.S.C. 154(b) by 0 days.

(21) Appl. No.: 10/775,918

(22) Filed: Feb. 10, 2004

(65) Prior Publication Data

US 2004/0189631 A1 Sep. 30, 2004

(30) Foreign Application Priority Data

Feb. 11, 2003 (DE) ................. 103 05 384

(51) Int. Cl.
*G09G 5/00* (2006.01)
*G06F 19/00* (2006.01)
*G05B 19/00* (2006.01)
*G05B 19/04* (2006.01)
*G05B 19/18* (2006.01)
*G05B 19/418* (2006.01)

(52) U.S. Cl. .............. 345/633; 700/245; 700/246; 700/253; 700/254; 700/264

(58) Field of Classification Search ........ 345/629–641, 345/473–474; 700/245–264, 166
See application file for complete search history.

(56) References Cited

U.S. PATENT DOCUMENTS 5,625,765 A  4/1997 Ellenby et al.
5,835,693 A * 11/1998 Lynch et al. ................. 345/473
5,876,325 A *  3/1999 Mizuno et al. .............. 600/102
6,044,308 A *  3/2000 Huissoon ..................... 700/166
6,157,873 A * 12/2000 DeCamp et al. ............ 700/253
6,587,752 B1 *  7/2003 Saito ........................... 700/264
6,615,112 B1 *  9/2003 Roos ........................... 700/254
6,763,284 B2 *  7/2004 Watanabe et al. ........... 700/264
2002/0082498 A1  6/2002 Wendt et al.

(Continued)

FOREIGN PATENT DOCUMENTS

DE       101 28 015 A1    6/2001

(Continued)

OTHER PUBLICATIONS

Paul Milgram, Shumin Zhai and David Drascic, 1993, Applications of Augmented Reality for Human-Robot Communication, *Proceedings of the 1993 IEEE/RSJ International Conference on Intelligent Robots and Systems;* Yokohama, Japan Jul. 26-30, 1993.

(Continued)

*Primary Examiner*—Jin-Cheng Wang
(74) *Attorney, Agent, or Firm*—McGlew and Tuttle, P.C.

(57) ABSTRACT

To improve the operation of robots in installations reprogramming and emptying an operating sequence to be performed by them, the invention provides a method and a device for visualizing computer-assisted information in an image of the real environment on a viewing device, in which there is a determination of the position and orientation or pose of the image receiving device and that robot-specific informations corresponding to this determination are faded over the image of the real environment on the viewing device.

44 Claims, 23 Drawing Sheets

U.S. PATENT DOCUMENTS

| | | |
|---|---|---|
| 2003/0012410 A1 | 1/2003 | Navab et al. |
| 2003/0216834 A1* | 11/2003 | Allard ........................ 700/245 |
| 2004/0172164 A1* | 9/2004 | Habibi et al. ................ 700/245 |
| 2004/0172168 A1* | 9/2004 | Watanabe et al. ............ 700/264 |
| 2005/0251290 A1* | 11/2005 | Skourup et al. ............. 700/245 |

FOREIGN PATENT DOCUMENTS

| | | |
|---|---|---|
| DE | 101 28 015 A1 | 12/2001 |
| EP | 0 840 909 | 5/1998 |
| EP | 1 215 017 A2 | 6/2002 |
| WO | WO 00/52536 | 9/2000 |

OTHER PUBLICATIONS

Miligram, Paul et. al Applications of augumented reality for human-robot communication Yokohama, Japan Jul. 26-30, 1993.

* cited by examiner

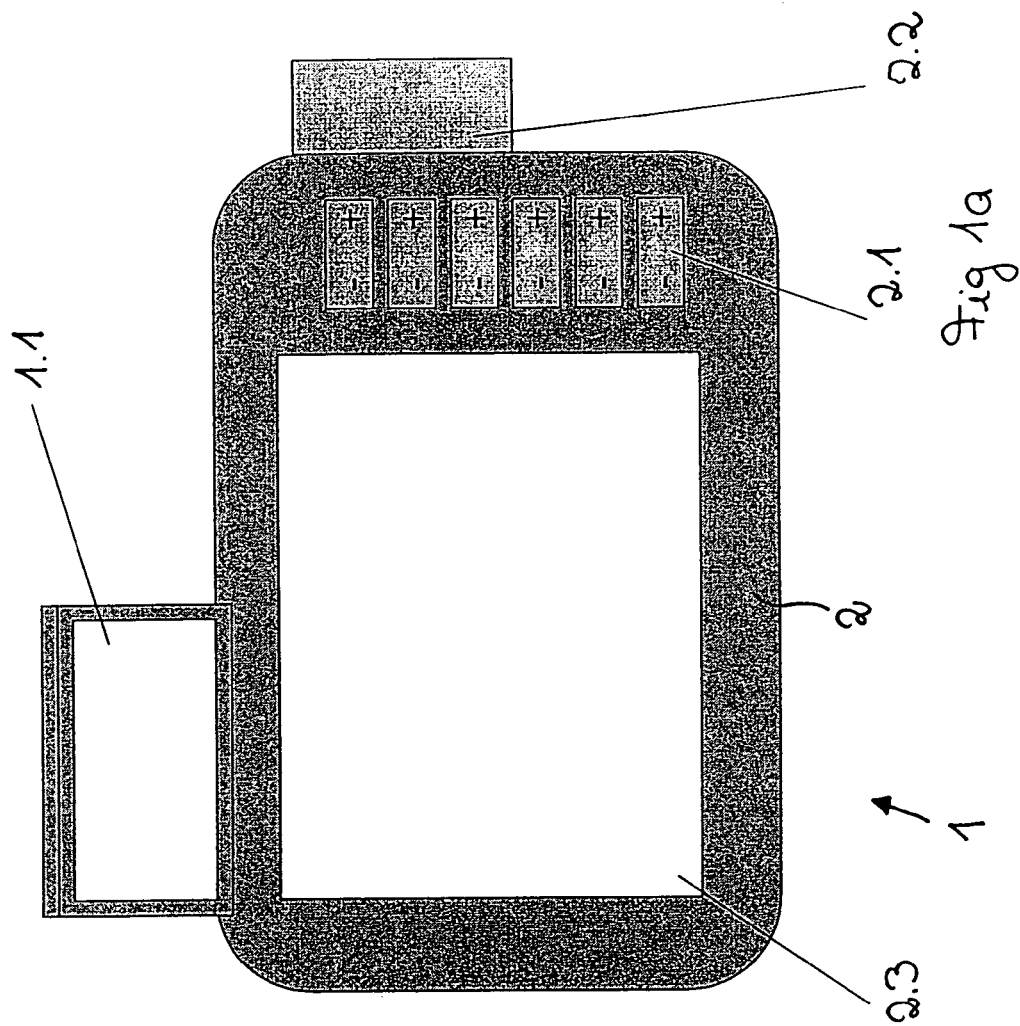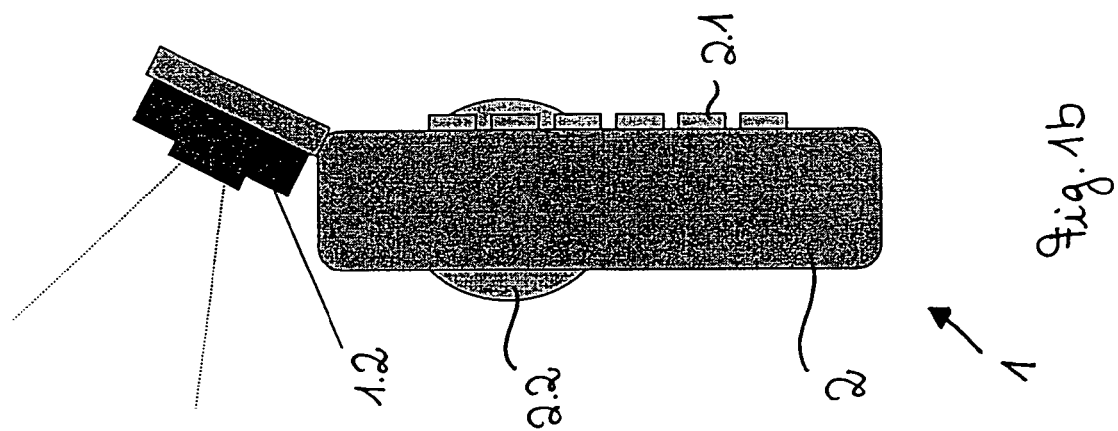

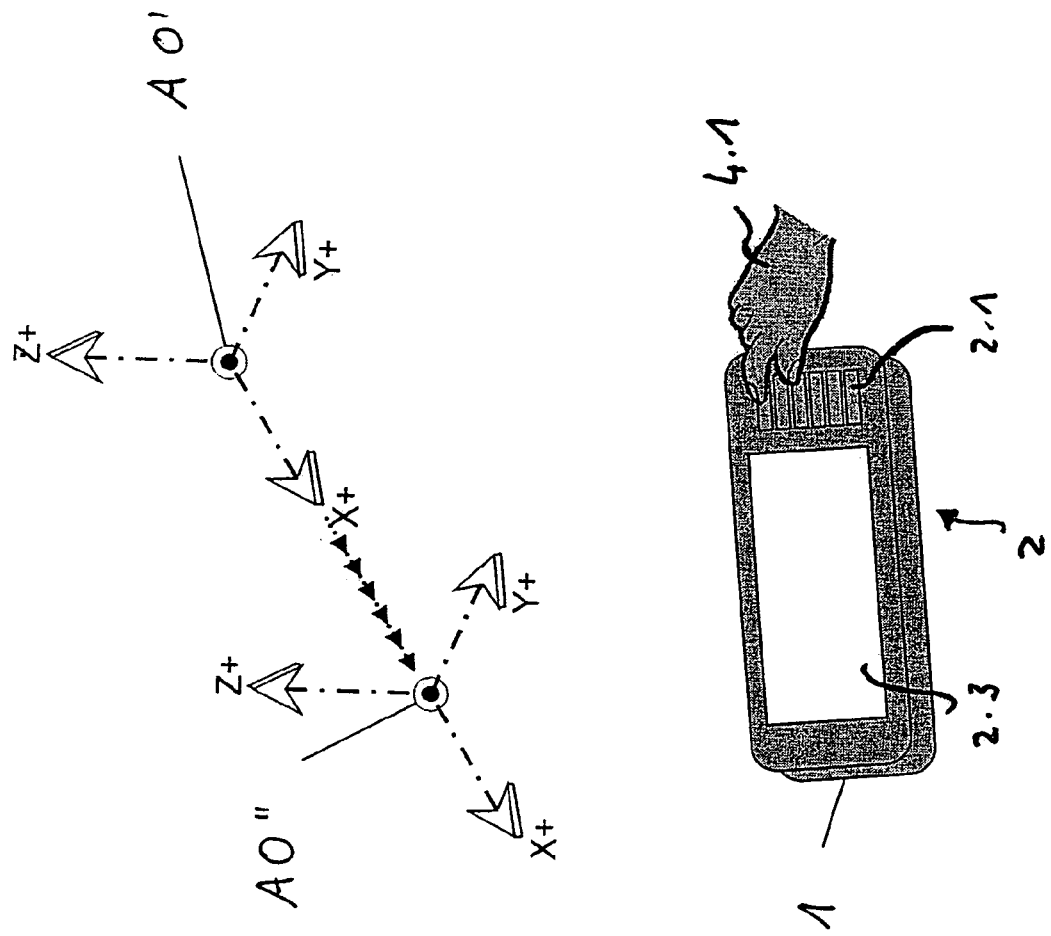

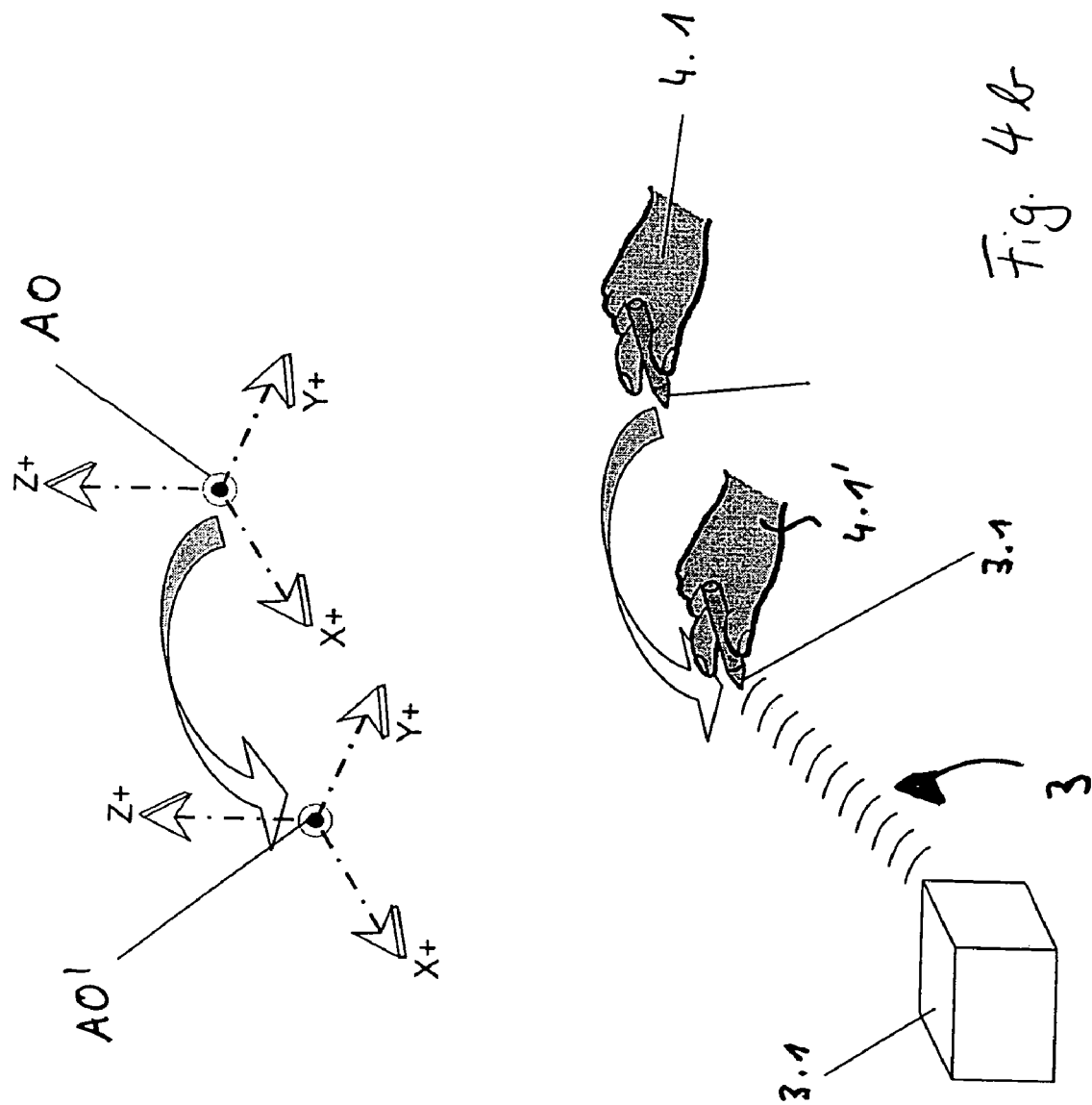

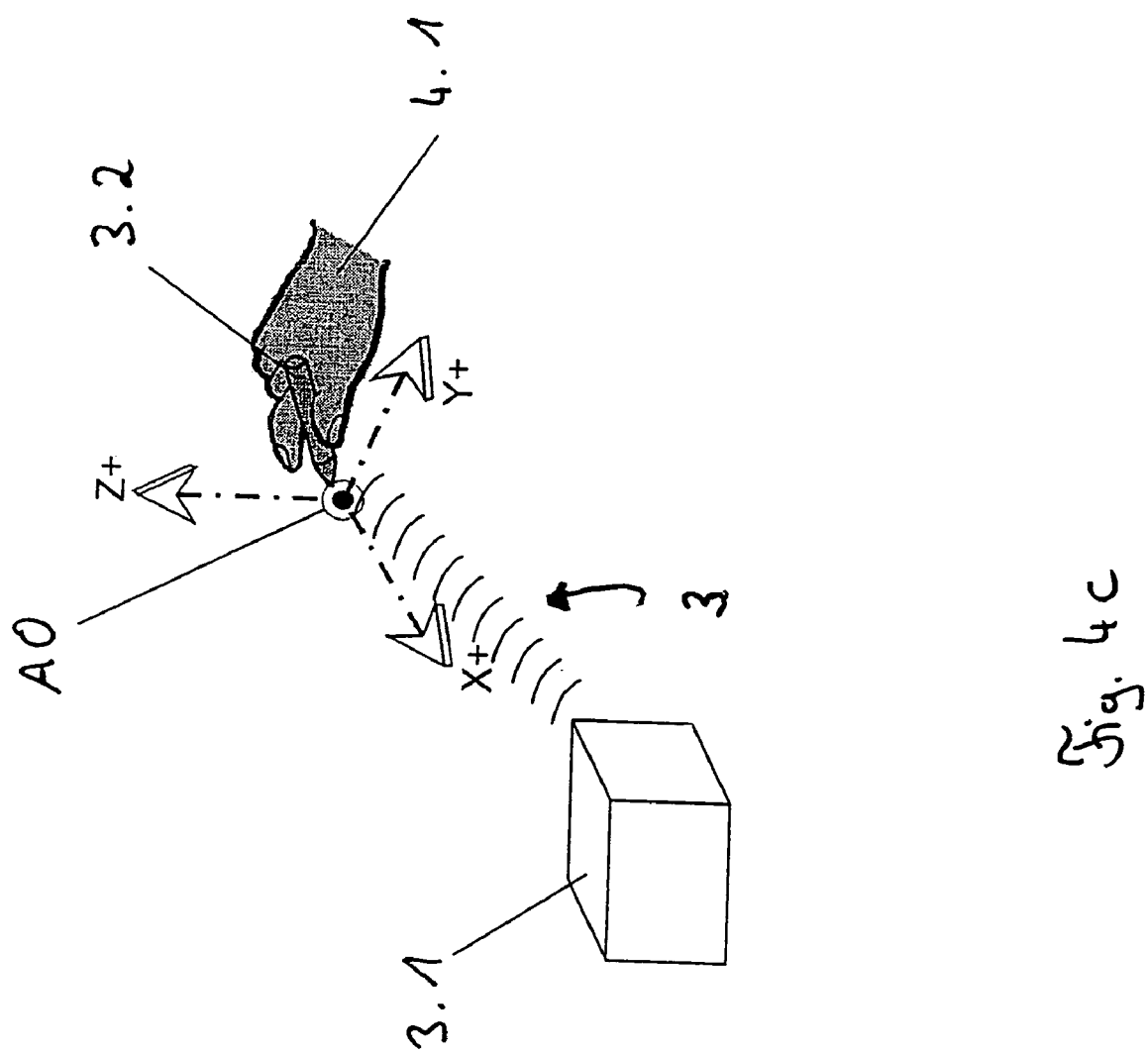

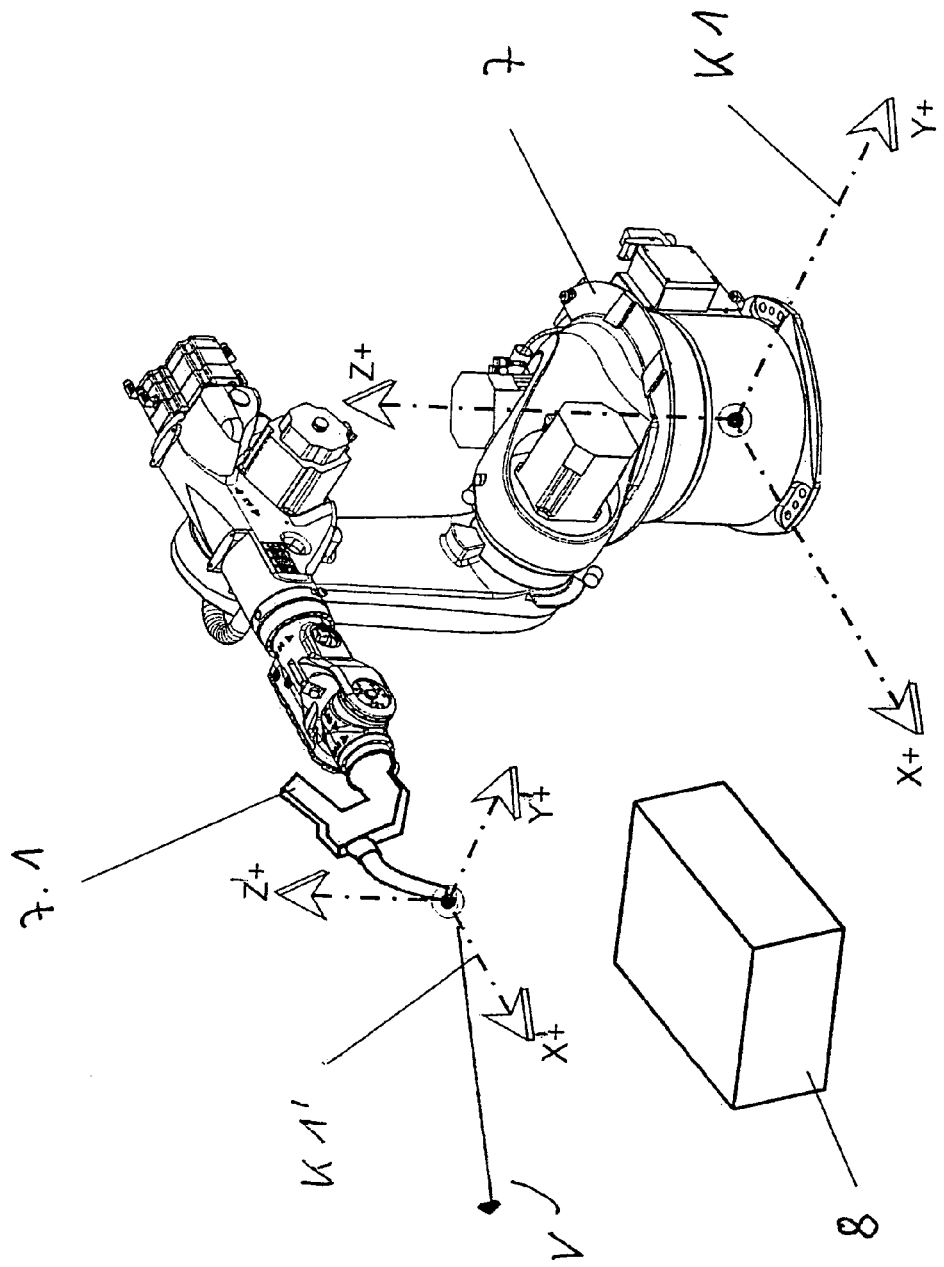

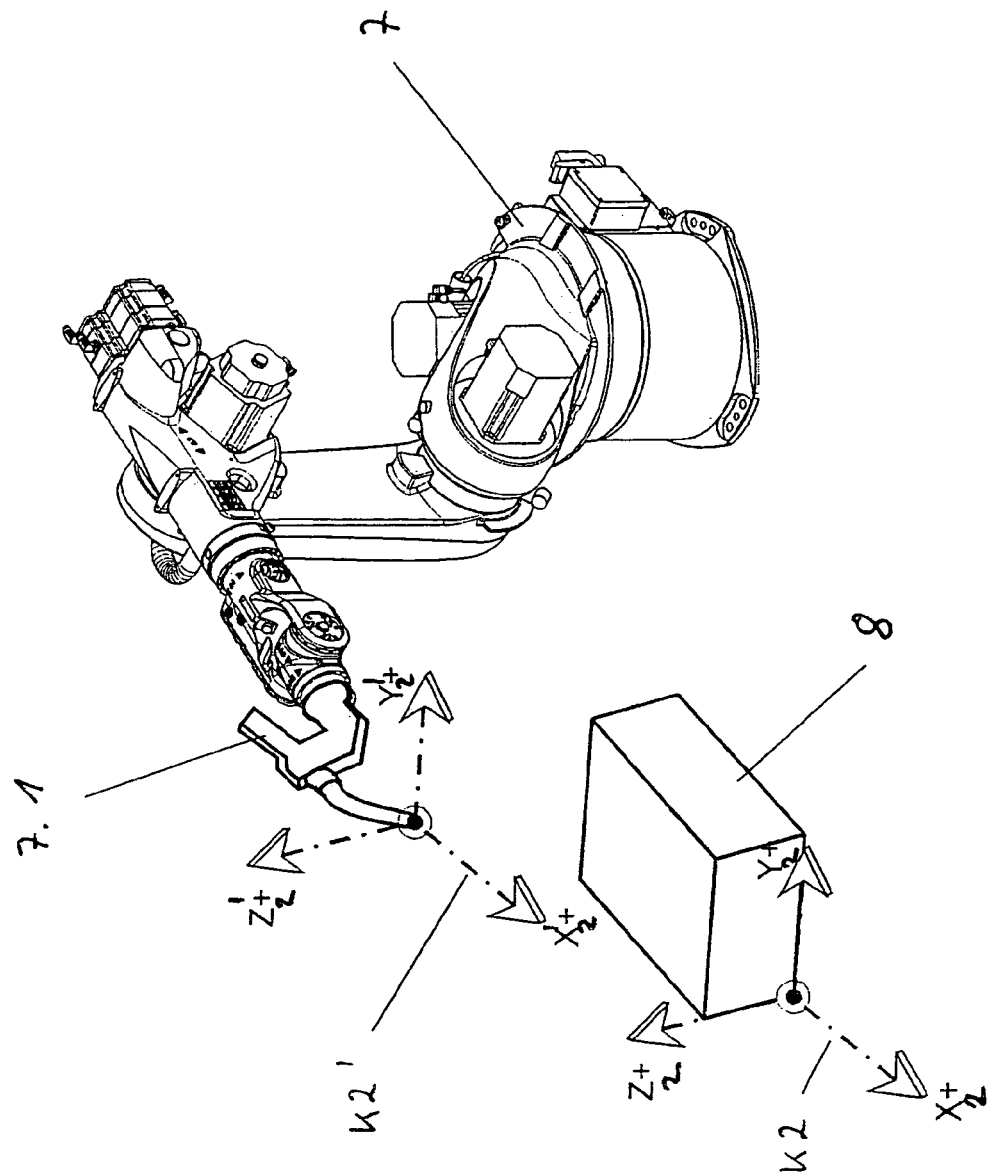

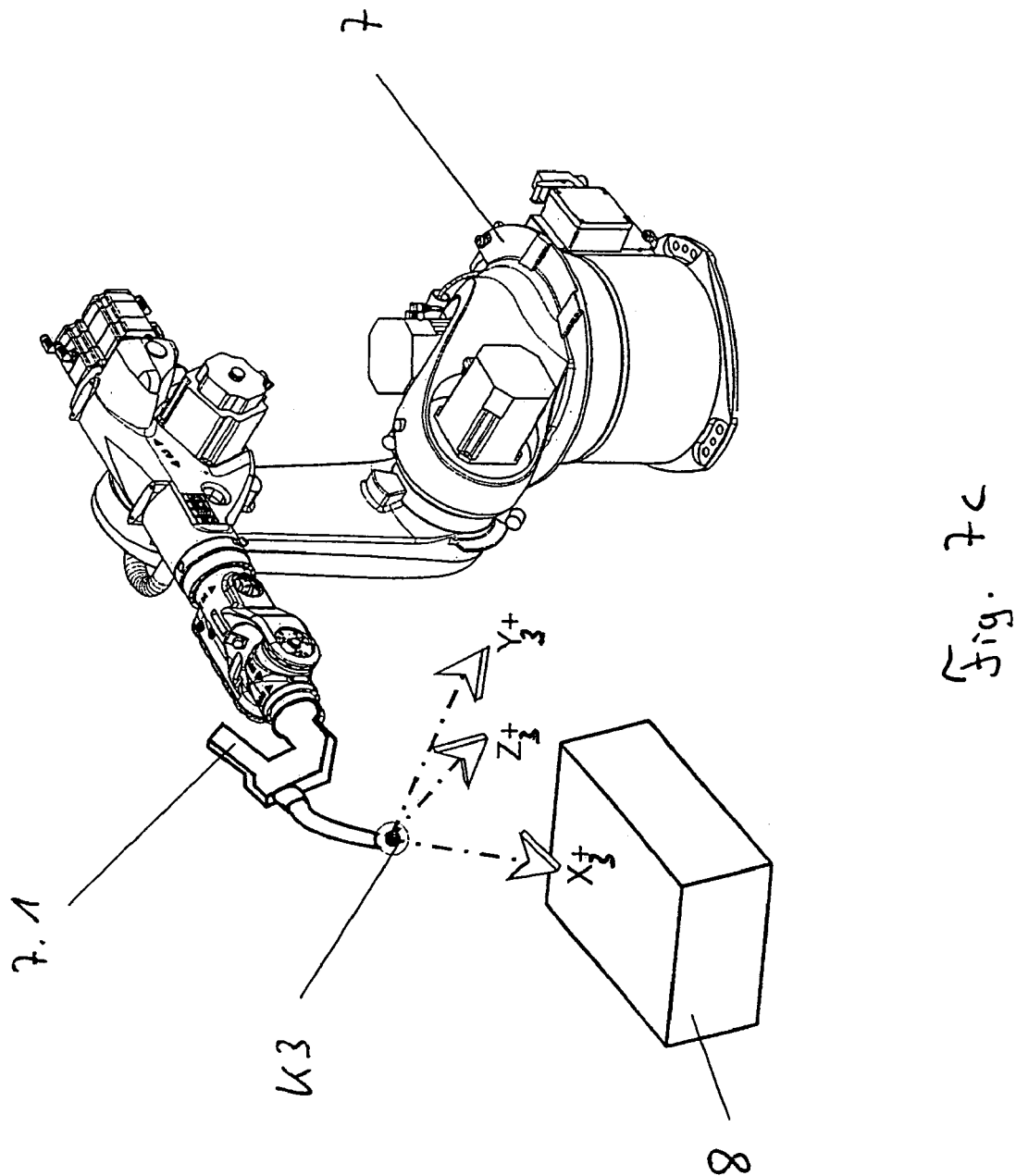

METHOD AND DEVICE FOR VISUALIZING COMPUTER-GENERATED INFORMATIONS

CROSS REFERENCE TO RELATED APPLICATIONS

This application claims the benefit of priority under 35 U.S.C. §119 of German Patent Application DE 103 05 384.0 filed Feb. 11, 2003, the entire contents of which are incorporated herein by reference.

1. Field of the invention

The present invention to a method and a device for visualizing computer-generated informations.

2. Background of the invention

WO 00/52536 discloses displaying computer-generated informations, such as in particular data bank and state informations concerning technical parts together with a real image of the corresponding technical part on a display, especially in text form. The joint display of real images and computer-generated informations is called augmented reality (AR).

In earlier times industrial robots were usually programmed once and for all at the time of putting into operation and then carried out for many years the same task without any change. Within the framework of more flexible automation reprogramming is more important as a time and cost factor.

In order to move a robot into a predetermined position or out of the way, it can be moved manually, particularly by a user using movement keys or also controlled by means of a 6D mouse. The robot movement direction is dependent on the selected reference coordinate system. It is not always immediately clear to the user which reference coordinate system has been selected or how this is oriented in space. In practice, careful trial and error is frequently used to establish whether the robot is moving in the desired direction. An error can lead to serious damage or even injuries to persons.

To a particular extent this applies to users having little robot experience, because the conception of reference coordinate systems in the case of problems assumes knowledge which a robot user must possess in order to be able to operate effectively with a robot system. However, it is often difficult to make this comprehensible to "robot movices", because they do not generally have the corresponding mathematical qualifications.

Nowadays the measurement of the tool center point (TCP) on an industrial robot usually takes place manually. Thus, e.g. a preset point is moved up to a number of times from different directions using the tool center and the corresponding robot positions are stored and from these the position and optionally the orientation of the tool center with respect to the robot hand flange is determined. The measurement of workpieces, i.e. the establishing of basic coordinate systems takes place in a similar way.

As a function of the intended use of the robot system (nature of the tool—welding, cutting, adhering and similar tool and its orientation with respect to the workpiece), the robot user must select a specific measurement method. If e.g. the zero point of the workpiece coordinate system to be measured is located outside the operating area of the robot, measurement has to take place indirectly using known points in space. A different measurement method must be chosen if the workpiece to be machined is guided on a gripper fixed to the robot flange. In order to cover all use cases more than 18 different measurement methods have become known. Even after comprehensive training, a robot user is generally unclear as to which measurement method should be used in a specific case. Even experienced users come up against knowledge deficiencies when new configurations occur, such as other "tools" and/or "workpieces", particularly as measurements are rarely performed.

The measurement procedure can be very complex and involves a considerable amount of time. In the frequently occurring case of a workpiece guided by a robot and with the tool stationary, it is e.g. necessary to carry out a triple measurement of positions and then possibly a determination of the orientation. A careful procedure is necessary, because an imprecise positioning can lead to a measurement method yielding no or no reliable results. The lack of visibility of the measurement results also leads to uncertainty as to whether a good measurement result exists or whether it has been falsified by method errors, incorrect inputs, etc.

Robot programs are nowadays frequently produced by teaching, in that the robot is moved manually to the target position of a movement and the corresponding path point is then stored. The path points of programs produced offline by means of a simulation must frequently subsequently be taught in situ, because the geometry of the simulation model and the real robot use environment seldom precisely coincide to an adequate extent. Even when replacing a defective robot mechanism by another such mechanism the path points in a robot program frequently have to be taught again, because the new mechanism has a slightly differing geometry as a result of manufacturing tolerances.

As robots may only move very slowly when humans are in the vicinity and the target position must be moved up to precisely, teaching or afterteaching is time-consuming. Moreover, despite the slow movement there is always a certain risk of damage to things and injury to people. This risk more particularly exists in the case of newly produced robot programs (e.g. offline by means of a simulation), which the programmer must allow to run on the robot for testing purposes.

When a problem or fault occurs in operation, the robot is frequently moved back along the programmed path. In such or other complex situations, the behavior of the robot system cannot be directly foreseen by the user. Here again damage to things and injury to people can occur.

In order to exclude collisions, for robot systems an operating area is fixed and which may not be penetrated by the robot tool or the entire robot or which the robot tool or robot may not leave. Other operating areas are jointly used by several "cooperating" robot systems and/or other equipment components and/or humans, so that the use thereof must be managed.

The fixing of operating areas in such an installation presupposes complicated measurement. The monitoring or adaptation of fixed operating areas in the plant is also very complicated, because no optical representation or display exists. It is unclear in the plant whether and in which zones the attainable operating areas of robot systems overlap, so that a collision risk exists.

In the case of manually guided operation of robot systems (robots as an intelligent assist device or "cobot") the degrees of freedom of motion of the robot are often artificially restricted in order to facilitate the activities of the user. Through virtual fixtures the robot effector is e.g. control-guided, e.g. always within one plane, in which the orientation is always kept parallel to the ground or the like.

Virtual fixtures constitute a special case of restricting the operating area of a robot system. Operating areas are volumes which are not left by the robot system or part thereof or which must not be penetrated by the same. In special applications in which a robot is guided by the user with respect to the tool, it can be appropriate to fix the orientation of the gripper on a software basis, whereas the gripper position in space can always be freely changed by the user. One application is the use of a robot as a joining aid in assembly. The robot carries the possibly heavy and bulky component and the user can move it with limited force expenditure. From the outset the component is in the position in which it is to be assembled. Another application is e.g. the painting of surfaces, in which the robot holds the tool (i.e. the paint spray gun) in a predetermined distance from the surface to be painted, whilst the user guides the gun over the surface. Such planned software-based restrictions to the movement possibilities are referred to as virtual fixtures, because they act in a manner similar to a mechanical forced guidance of the robot gripper.

The information concerning the operating areas or virtual fixtures are present as abstract mathematical information in the robot control.

The virtual fixture can change dynamically as a function of the present task. Fixing or modifying virtual fixtures or operating areas during programming exceeds the necessary conception capacity of many users, so that it is not immediately apparent to the user in which directions a path and/or rotary movement of the robot or more precisely its tool center point or TCP is possible or is blocked. As the user cannot foresee the behaviour of the robot system, the user is made uncertain. As a result of incorrect manipulation, such as e.g. the exerting of high forces in one direction, which are blocked by a virtual fixture, damages can arise on the robot system.

In present manufacturing plants frequently numerous robots are tightly juxtaposed. Each of these robots has its own manual programmer. A clear association between the manual programmer and the robot in principle exists by means of an optionally present connecting cable between the two. In this situation the subsequent tracking of one specific manual programmer with the associated robot connecting cable during the putting into operation and programming of a robot system and also possibly during subsequent operation takes much effort and time, so that in practice use is generally made of the trial and error method, in which a manual programmer is carefully operated and a check is made as to whether the desired robot moves and if not another manual programmer is tried out. The same applies if no cable is present and instead communication between the manual programmer and the robot control takes place in wireless form.

The problem of the invention is to provide a method and device by means of which there is a simplification to the operation of one or more robots for the purpose of setting up, programming, teaching of the movement sequences to be performed by them and the like.

SUMMARY OF THE INVENTION

In the case of a method of the aforementioned type, the problem of the invention is solved in that a determination of the position and orientation or pose of the image receiving device takes place and that robot-specific informations corresponding to this determination are faded over the image of the real environment on the viewing device.

With regards to the device, the problem is solved by a device for the visual fading of computer-generated informations into an image of the real environment, in which there is a means for determining the pose of the image receiving device and a means for fading robot-specific informations corresponding to the determination over the image of the real environment on the viewing device.

Within the scope of the present invention the term robot-specific information comprises informations relating to the operation of a robot, such as particularly information concerning its operating and program data, on the actual robot itself, the workpieces to be manipulated by the robot and obstacles located in its vicinity such as equipment, parts, in each case concerning the pose and movement. The information is in particular faded in pictorially onto the viewing device.

The invention permits greater flexibility of the automation of operating sequences by means of robots, because reprogramming is facilitated.

The invention makes the putting into operation, programming and operating of robots more simple and efficient. The invention more particularly relates to groups of robots of complex installations having additional robot components, such as conveying installations.

According to a first, preferred development of the invention, at least one robot-specific reference coordinate system is faded in and in particular hand flange-fixed coordinate systems are faded in. The visualizing of the robot hand flange coordinate system and therefore also the tool fixed to the hand preferably takes place in such a way that the origin of this coordinate system is preferably reproduced on the TCP (TCP coordinate system). It is also possible to visualize other reference coordinate systems, such as in particular the stationary "world coordinate system" or stationary workpiece-fixed, basic coordinate system, the latter preferably being in the center of symmetry of the stationary robot base.

In the case of static basic coordinate systems (world, base) as a function of the given requirements, additionally or alternatively it is possible to fade in a coordinate system shifted into the TCP and whose directions in space correspond to that of the stationary reference coordinate system, but which moves jointly with the robot flange.

According to another preferred development, the robot axes are faded in. The virtual robot axes are so superimposed on the real image of the robot, that they correspond to the axes of the individual parts of the robot (base, rocker, robot arm and robot hand) or coincide therewith and in this way represent the same.

The coordinate directions are faded in on the robot system, e.g. on its tool center point and optionally also designated (e.g. X, Y, Z in the case of the Cartesian method and e.g. axis 1, axis 2, axis 3, etc. for the axis-specific method). It can also be appropriate to accentuate the active coordinate direction or directions or axis or axes graphically, e.g. by colour or animation.

In order to permit a direct manipulation of reference coordinate systems a coordinate system of the selected type is automatically generated at a predetermined position and visualized. The coordinate system can be shifted and turned by the user under visual control until the desired position and orientation or pose is reached.

The inventive visualization of the selected reference coordinate system or robot axes on the real robot system by means of augmented reality (AR), makes it more easily for the user to foresee the manual displacement, particularly by means of the robot system displacement keys.

The manipulatability of the reference coordinate systems made possible by the invention makes it unnecessary for the user to learn and carry out cumbersome, complicated measurement methods. A manipulation of augmented, virtual objects is intuitive, saves time and cost and only requires reduced qualifications on the part of the user.

Another preferred development of the invention is characterized in that the image of a control element of a robot manual programmer movable in at least two dimensions is faded in and in particular the image of the control element is faded in in association and orientation of the robot hand flange. It is made clear to the user and conception is facilitated as to which movement the robot and in particular the hand thereof, together with a tool fixed thereto will be carried out if the real control element, e.g. on a manual programmer is operated. The control element can either be faded in on the robot system TCP and moved therewith, or the input element can be faded onto the display at a predetermined position, or can be fixed in space.

In the case of control elements having a symmetrical construction, the position of the coordinate system in the faded-in input element may not be directly detectable for the user. In such a case it can be appropriate to make additional markings, (e.g. a graphic symbol) on the faded-in input element. In this sense e.g. also the normal position of the hand of the user on the control element can be faded in. With a control element having six degrees of freedom (e.g. a 6D mouse), it may also be sufficient to fade in the hand of the user without the control element.

Apart from the visualizing of virtual elements, such as coordinate systems or robot axes or also real elements in virtual form, such as a control unit on a manual programmer, together with the image of the real robot according to a highly preferred development it is also possible to visualize a robot and its movement sequence in a real environment and with the real workpieces present there. This reduces the risk of damage to things and injury to people. The time exposure is reduced, because the augmented robot can move at random speed, even if people are in its immediate vicinity.

For teaching path points the simulated robot is moved by the user and the path points are stored on reaching the desired target position. When testing programs, the simulated robot covers the programmed path in place of the real system. This can take place at the programmed speed or any other random speed. The following of the path need not be simulated close to reality. It can be advantageous to merely successively fade in the target poses (i.e. to jump from path point to path point), in order to check and optionally adapt them.

According to a further development, a robot path to be traversed by a robot during an operation and in particular that of the tool center point can be faded in together with additional information, preferably associated with the robot and more precisely the image of its real hand flange or the TCP of a tool. By programming or manipulating processes, which are performed by an operator on a manual programmer, there is a change in space to the display of the visualized robot path, which is displayed in association with the robot, i.e. extending through the hand flange or TCP of a tool. This can in particular take place in that path points are faded in, the position of the path points in space is variable and in each case a robot path curve corresponding to the position of all the path points is faded in.

In addition to the spatial path pattern, additional motion parameters (e.g. speeds, accelerations, etc.) or special functions (e.g. path switching functions, setting/reading of inputs/outputs, starting/stopping machining processes, etc.) can be visualized. This information can be visualized in text form, but also graphically or by animation.

According to a further development for adapting a robot path to the position of a determined real workpiece, a virtual image of the workpiece is faded in together with a robot path adapted thereto, so that by superimposing the virtual workpiece image and the path points of the robot with the image of the real workpiece it is possible to adapt the robot path to be performed to the position of the real workpiece.

According to other preferred developments of the invention the total operating area reachable by a robot and/or permitted operating areas and/or non-permitted operating areas are visualized on the display and/or movement corridors of a robot tool, robot hand and/or further robot elements are visualized on the display. "Total operating area" designates the total number of all the poses which can be assumed by the TCP. "Operating areas" can be fixed at random by the programmer.

In the case of a plurality of robots, which e.g. interact in an installation, it is also possible to visualize permanent and/or instantaneous associations of at least one manual programmer of at least one robot.

In a similar manner to the association between the robot system and manual programmer, it is also possible to visualize and if necessary modify via the AR the present state of the robot system. Examples for states to be visualized are the selected operating mode, the state of the drives (on or off), etc.

It is common to all the described, preferred developments that the computer-generated informations can either be constantly visualized for the user or when requested by him (e.g. in conjunction with the manual displacement in the case of an operation of a displacement key if the authorization key is not pressed). According to another alternative the information is automatically faded in at a predetermined time (e.g. shortly before the real robot system starts moving).

In the above-described four use sectors the AR system can supply a continuous image sequence or, initiated by the operator, individual "snapshots". Correspondingly the information is faded in either online into the image sequence or offline into the recorded individual image.

Visualization can also be switched off. In the case of a continuous image sequence it is optionally also possible to freeze the image.

The visualization of generated objects can have random degrees of reality proximity. Visualization can also be performed in semitransparent manner or as an edge model, in order not to impair the viewing by the user of the plant.

The various features of novelty which charcterize the invention are pointed out with particularity in the claims annexed to and forming a part of this disclosure. For a better understanding of the invention, its operating advantages and specific objects attained by its users, reference is made to the accompanying drawings and descriptive matter in which the preferred embodiments of the invention are illustrated.

BRIEF DESCRIPTION OF THE DRAWINGS

In the drawings:

FIG. 1a is a plan view showing a first embodiment of a device for fading computer-generated informations into an image of the real environment.

FIG. 1b is a side view of FIG. 1a.

FIG. 2b is a side view of FIG. 2a.

FIG. 4a-4c are representations regarding the manipulation of augmented objects spatial made possible by the invention in several variants.

FIG. 6a Is a block diagram of the device according to the invention corresponding to the embodiment of FIG. 2a.

FIGS. 7a-c Are representations of selectable coordinated systems and displacement indicators (FIG. 7a) for manual, Cartesian movement FIGS. 8 to 17 Are combined representations producible according to the invention of areas of the real environment together with robot-specific, computer-generated information as augmented reality displays.

DESCRIPTION OF THE PREFERRED EMBODIMENT

Figure 2A:
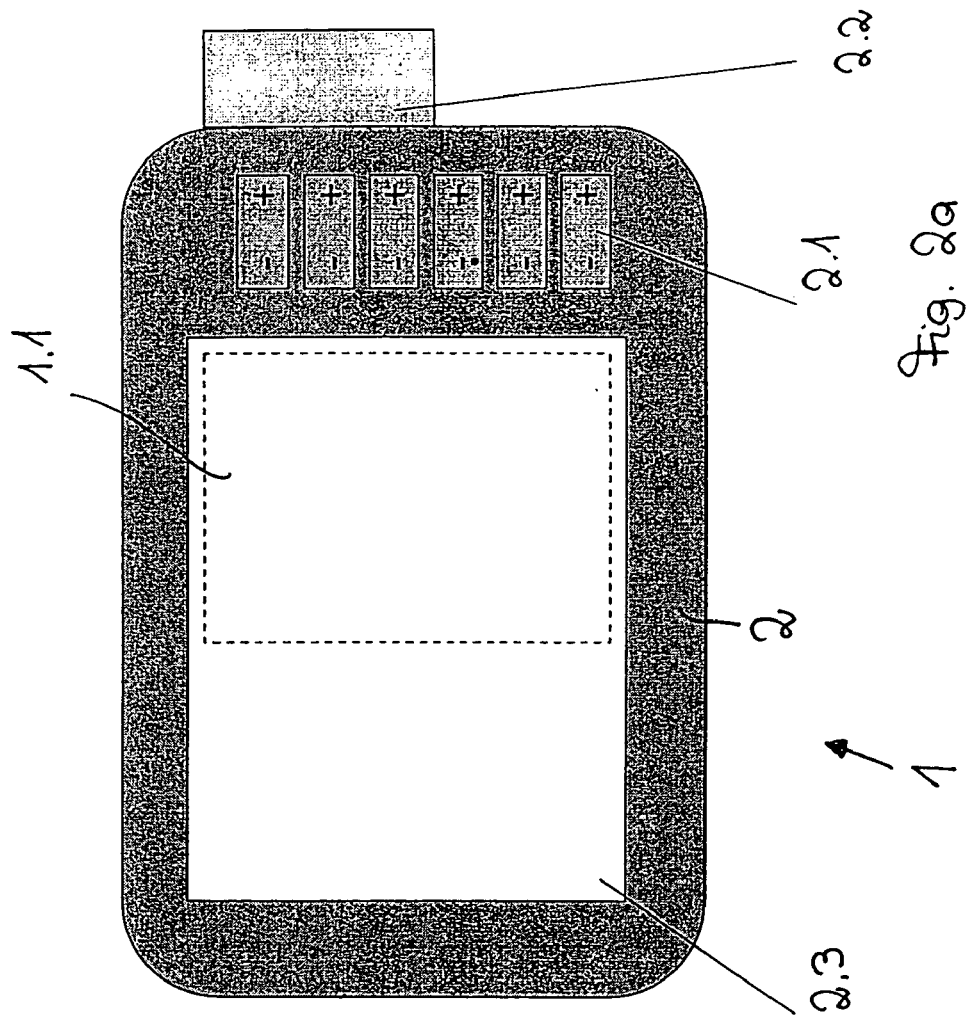
FIG. 2a is a plan view showing another embodiment of the inventive device.

Referring to the drawings in particular FIGS. 1a and 1b show a first embodiment of an inventive device 1 for fading computer-generated informations into an image of the real environment on a display.

The device 1 according to the invention has a manual programmer 2 for a robot with which the operating sequence of a robot can be comfortably programmed. The manual programmer 2 is provided for this purpose with control or operating elements in the form of six displacement keys 2.1 and a 6D mouse 2.2 by means of which the movements of the six axes of a robot can be controlled in the same way as through the keys 2.1. Such a manual programmer is known from EP 840 910 (corresponding to U.S. Pat. No. 6,134,102) or EP 840 909 (corresponding to U.S. Pat. No. 6,362,813), to which explicit reference is made in connection with the disclosure of such a manual programmer. The manual programmer 2 also has a screen 2.3 on which are displayed information and data of the control program, such as different parameters concerning the movement sequence for the robot movement. It is e.g. possible to input by means of not shown, physical keys or in that the screen 2.3 is constructed as a touch screen and input keys are faded onto the screen 2.3.

In the embodiment according to FIGS. 1a and 1b, separated from the screen 2.3, the inventive device has an additional viewing device 1.1, which nevertheless is physically connected to the manual programmer 2 and can e.g. be pivotably fitted thereon. In the represented embodiment on the back of the viewing device 1.1 is provided an image receiving device 1.2 in the form of a camera by means of which the real environment can be recorded. As a result of this recording, e.g. by markings positioned in space, it is possible to mathematically determine the position and orientation in space, for short referred to as the pose of the image receiving device 1.2. Alternatively the pose of the image receiving device 1.2 can be provided by a comparison of the actual image recorded by it with a stored reference image or by using an additional sensor system.

On the viewing device 1.1 is shown on the one hand the image of the real environment recorded by the camera 1.2 and on the other robot-specific, computer-generated information is also faded into the image, as is e.g. shown in the views of the device 1.1 in FIGS. 7 to 17.

In place of a viewing device 1.1 in the form of a conventional graphicable screen, the device can also be a transparent screen, so that, optionally by means of an imaging optics can be shown and rendered visible on the viewing device 1.1 an image of the real environment without optoelectric conversion. The determinations of the pose can e.g. also take place technically in such cases, in that radio markings are provided in space and relative to these it is possible to determine the pose by means of a receiver which is at least connected to the viewing device 1.1.

Figure 3:
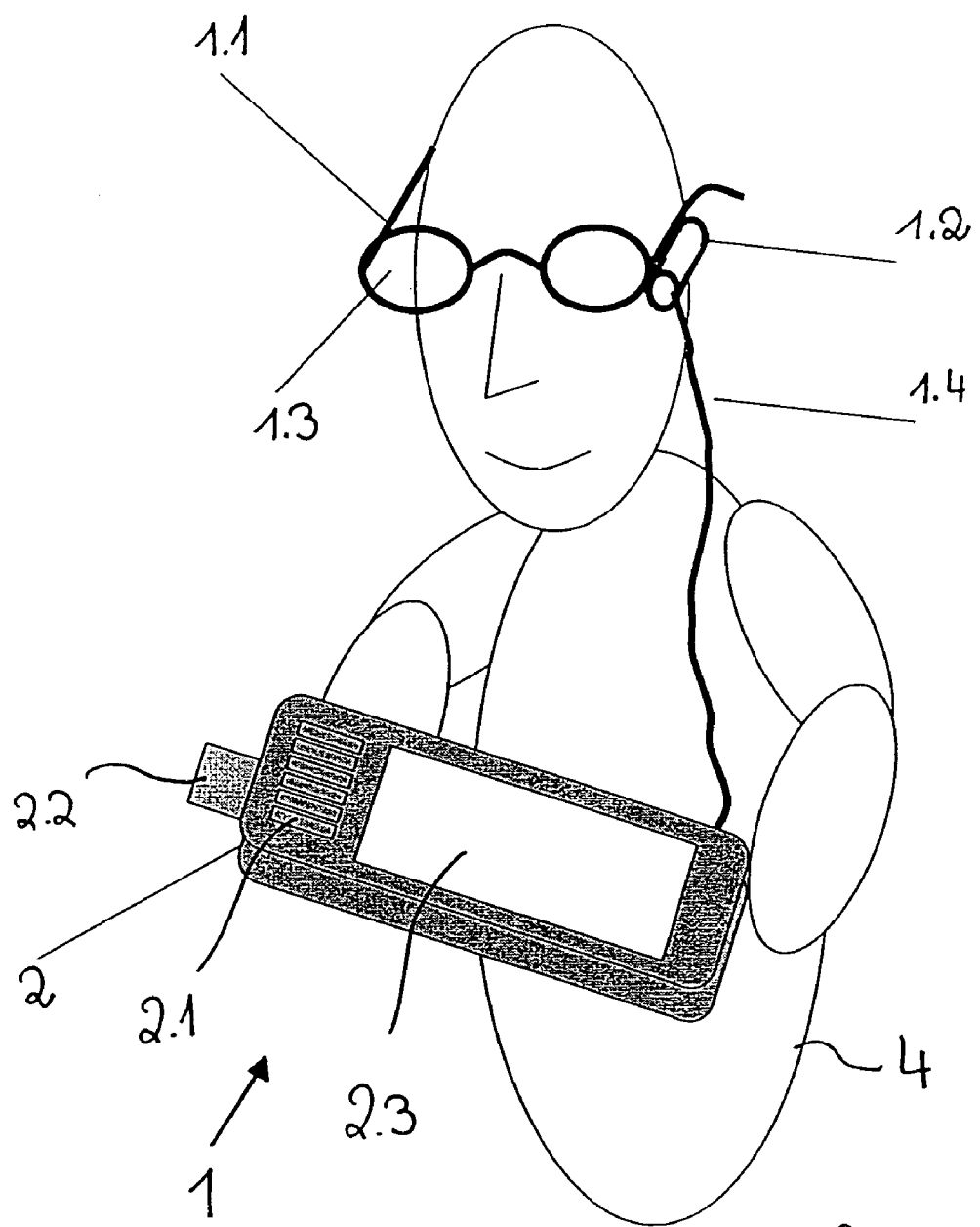
FIG. 3 is a plan view showing another embodiment of the inventive device.

The viewing device 1.1 can also be spatially separated from the manual programmer 2, as is e.g. the case in the special construction according to FIG. 3.

Figure 2B:
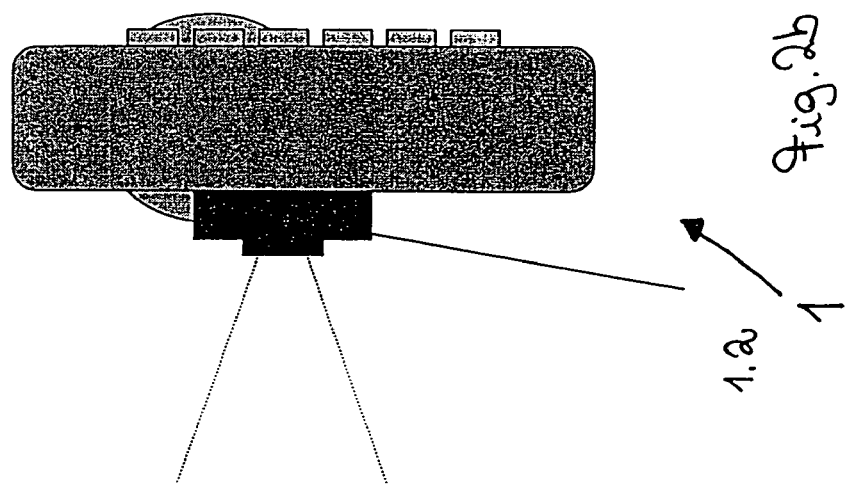

In place of a separate screen as the viewing device 1.1 and as is e.g. the case in FIGS. 1a and 1b, the viewing device 1.1 showing an image of the real environment together with the robot-specific, computer-generated information can also be integrated into the manual programmer 2, e.g. as a screen window within the screen display 2.3 of the manual programmer 2, as is the case in FIGS. 2a and 2b.

In such a case a camera 1.2 for recording the real environment is positioned directly at the manual programmer 2, as is particularly apparent from FIG. 2b. It can also be completely separate from the viewing device 1.1, particularly if e.g. an appropriate recording location is not or is not readily accessible to the user.

Otherwise the construction of FIGS. 2a and 2b corresponds to that of FIGS. 1a and 1b, particularly with respect to the manual programmer 2.

FIG. 3 shows a device according to the invention with a viewing device 1.1 in the form of spectacles, where the user 4 can directly see the real environment through lenses 1.3 (see-through spectacles), the lenses 1.3 being constructed as a transparent screen into which can be faded the robot-specific, computer-generated information. For this purpose the viewing device 1.1 is connected by means of a cable 1.4 to a manual programmer 2, which can also be replaced by wireless transmission, particularly radio transmission, but also infrared transmission. At the viewing device 1.1 is provided a camera 1.2 by means of which and using corresponding optical markings in space, it is possible to establish the pose of the viewing device 1.1. Additionally or alternatively the pose of the viewing device 1.1 or image receiving device 1.2 can be obtained by a comparison of the camera image with a stored image. It is fundamentally also possible to provide an electromagnetic, optical or acoustic sensor system by means of which it is possible to establish in the manner described hereinbefore the pose of the image receiving device or viewing device relative to corresponding marking transmitters in space.

The invention permits a manipulation of robot-specific data by the manipulation of virtual or augmented robot-specific space objects, such as the robots themselves, path pattern, workpieces, etc. and this will be explained relative to FIGS. 4a to 4e.

The known control elements on the manual programmer, such as the displacement keys/6D mouse can be used, by operation through the hand 4.1 of a user, for shifting and rotating the selected, augmented space objects, AR' indicating the pose of the shifted space object, similar to the TCP of a real robot system being moved in space. Compared with purely AR visualization, the time involved is limited.

The position of an input element in space can be determined by a sensor system 3 with a stationary receiving system 3.1 and an input element 3.2, e.g. in the form of a pointer. If a user moves an input element 3.2, this movement is transmitted to the selected, augmented space object AR (or optionally several of these).

In order to improve the ergonomy, the movement can be transmitted to the selected space object on an increased or decreased scale corresponding to a scaling factor preset by the user. The production of the "coupling" of the spatial movements of the input elements and the augmented space object takes place through a corresponding input on the part of the user (e.g. for as long as the user keeps a button on the input element depressed). By alternating "coupling" and "decoupling", it is also possible to displace over considerable distances augmented space objects without the input element having to be moved over a correspondingly large distance, so that an "indexing" takes place.

Input elements in the aforementioned sense are e.g. a pointer, a handle, a data glove or the actual manual programmer. The sensor system can be based on electromagnetic (e.g. radio), optical (e.g. infrared) or acoustic (e.g. ultrasonic) tracking. If the manual programmer is used as the input element, the aforementioned system already present therein for determining the spatial pose can also be used for manipulating space objects.

Alternatively the pose of the input element (e.g. a pointer) can be measured and evaluated relative to the handheld manual programmer instead of the ground. In addition to the aforementioned possibilities, the pose of the input element can also be used through a mechanical measuring system between the input element and the manual programmer, such as multijoint kinematics with integrated joint angle sensors.

Space objects can be directly preset using an input element 3.1 (e.g. a pointer, a handle, a data glove or the complete manual programmer), whose pose in space is detected by a corresponding system.

The essential advantage of the manipulation possibilities according to FIGS. 4b and 4c is that the manipulation of space objects via the spatial positioning of an input element saves time and is more intuitive for the user than when using a speed-controlled displacement and rotation, e.g. using movement keys or a 6D mouse.

The described manipulation possibilities can be imaged on any of the described AR use senarios (shifting of the reference coordinate system during the measurement of tool and workpiece coordinate systems, displacement of the support points of robot paths, displacement of the corner points or side walls of operating areas, etc.).

Figure 5:
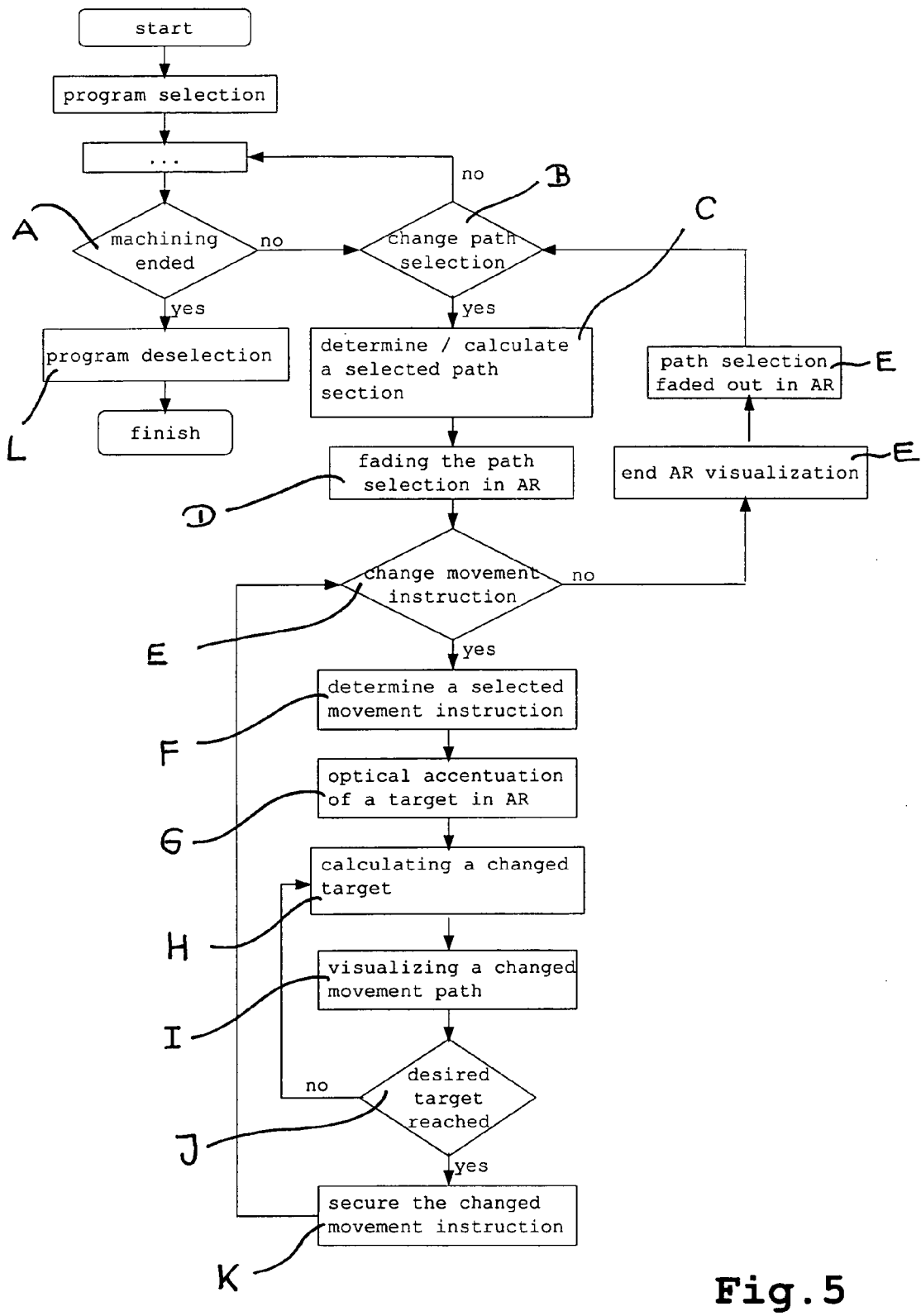
FIG. 5 Is a flow diagram exemplified manner concerning the AR-assisted modification of a robot path.

The sequence for an AR-assisted modification of a robot path shown in FIG. 5 initially involves a reprogram selection with an interrogation of the machining status to establish whether or not it has been concluded (step A). If the answer is in the negative there is an interrogation as to whether a path section is to be modified (step B). If this is not the case there is a return jump. If a path section is to be modified, then in the program there is a determination or calculation with respect to a selected path section and this can include the entire path of the tool center point (step C). The selected path section or the entire path are faded into an image of the real environment on the viewing device (step D). This is followed by an interrogation to establish whether a displacement instruction or several such instructions are to be modified. If this is not the case the visualization is ended (step D') and the path section faded out (step D") and there is a return to interrogation B.

On modifying a displacement instruction or several of these optionally the associated path is determined (step F). The target of the selected displacement movement and optionally also the associated path of the tool center point is graphically accentuated in the AR display (step G). Optionally also the orientation is appropriately visualized by fading in a coordinate system, as will be explained hereinafter relative to FIG. 14.

On the basis of the preset details described in connection with FIGS. 4a to 4c on the part of the user by the shifting of the path and optionally the target in space, now modified targets and optionally paths are determined (step H) and visualized in the AR display (step I), so that the position of the target and optionally the path in the AR display can be checked. Optionally the software of the robot control checks whether the target can be reached by the robot and optionally generates warning messages.

After calculating and displaying desired targets and optionally paths in accordance with steps H and I, there is an interrogation as to whether the desired target and optionally the desired path pattern has been reached (step J). If this is not the case, the determination and visualization of another target and optionally path pattern can be repeated, so that steps H and I are repeated. If the desired target has been reached, there is a securing thereof and the associated movement instruction (step K).

There is then a return to interrogation E as to whether another displacement instruction is to be modified. If this is the case steps F to K are performed again for the same, whereas if it is not the case, as explained relative to steps E', E", there is a return to the interrogation as to whether a further path section is to be modified (step B). If this is not the case, as has been explained, there is a return to the interrogation concerning the machining status and, if no further machining is to take place, a deselection of the program and therefore the ending thereof (step L).

The insertion of a further target of a displacement movement takes place correspondingly, a starting position being inputted or on the part of the program can be automatically proposed and the target position of the preceding movement can be present therein.

The represented program sequence can be further automated and simplified, in that e.g. robot paths are automatically faded in directly after opening the program and/or a selection of possible robot paths is automatically visualized. The user can optionally observe corresponding robot paths in augmented reality in a type of preview on marking a program in a program survey of the manual programmer.

Figure 6:
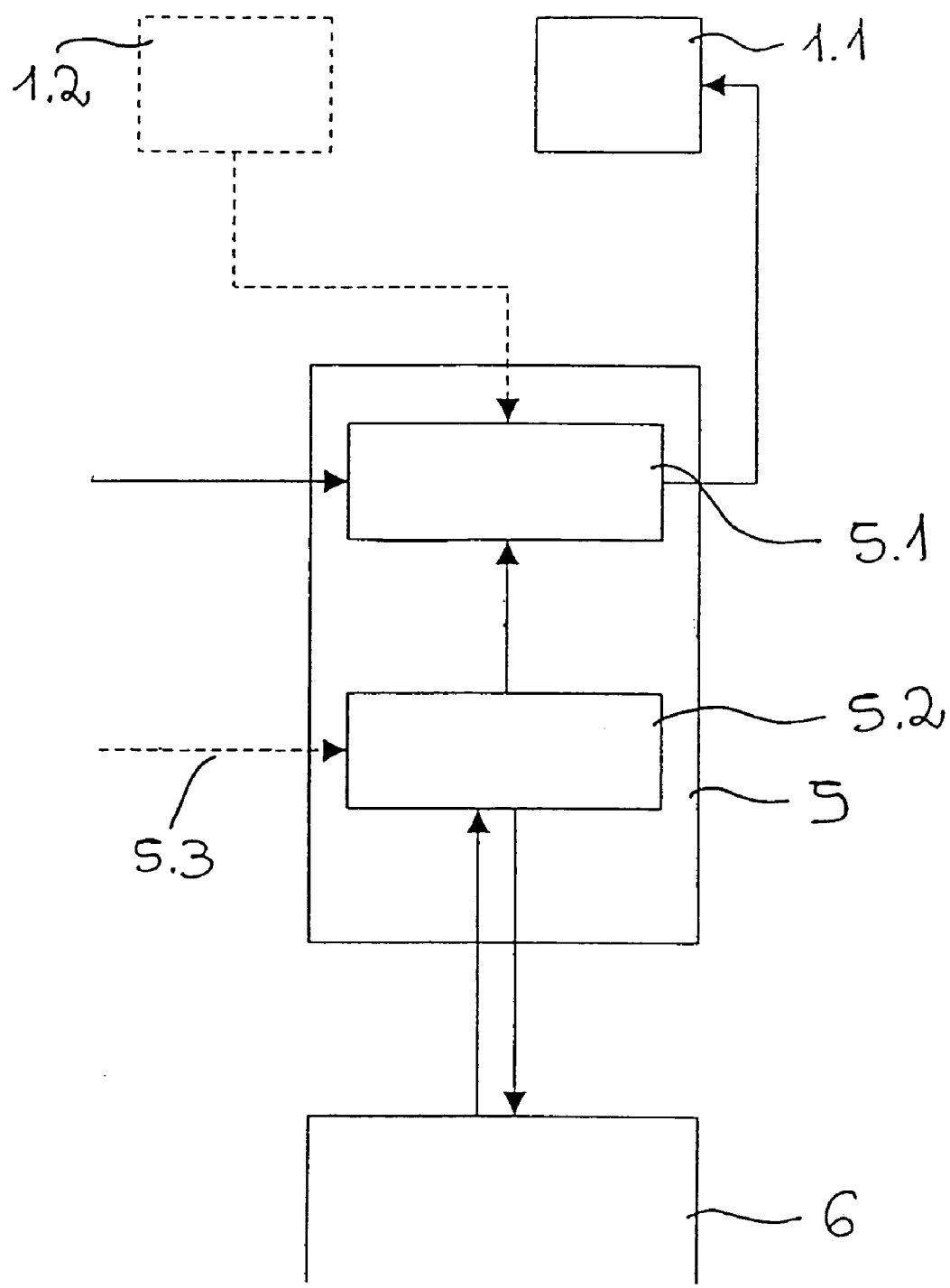
FIG. 6 Is a block diagram of the device according to the invention.
Figure 6A:
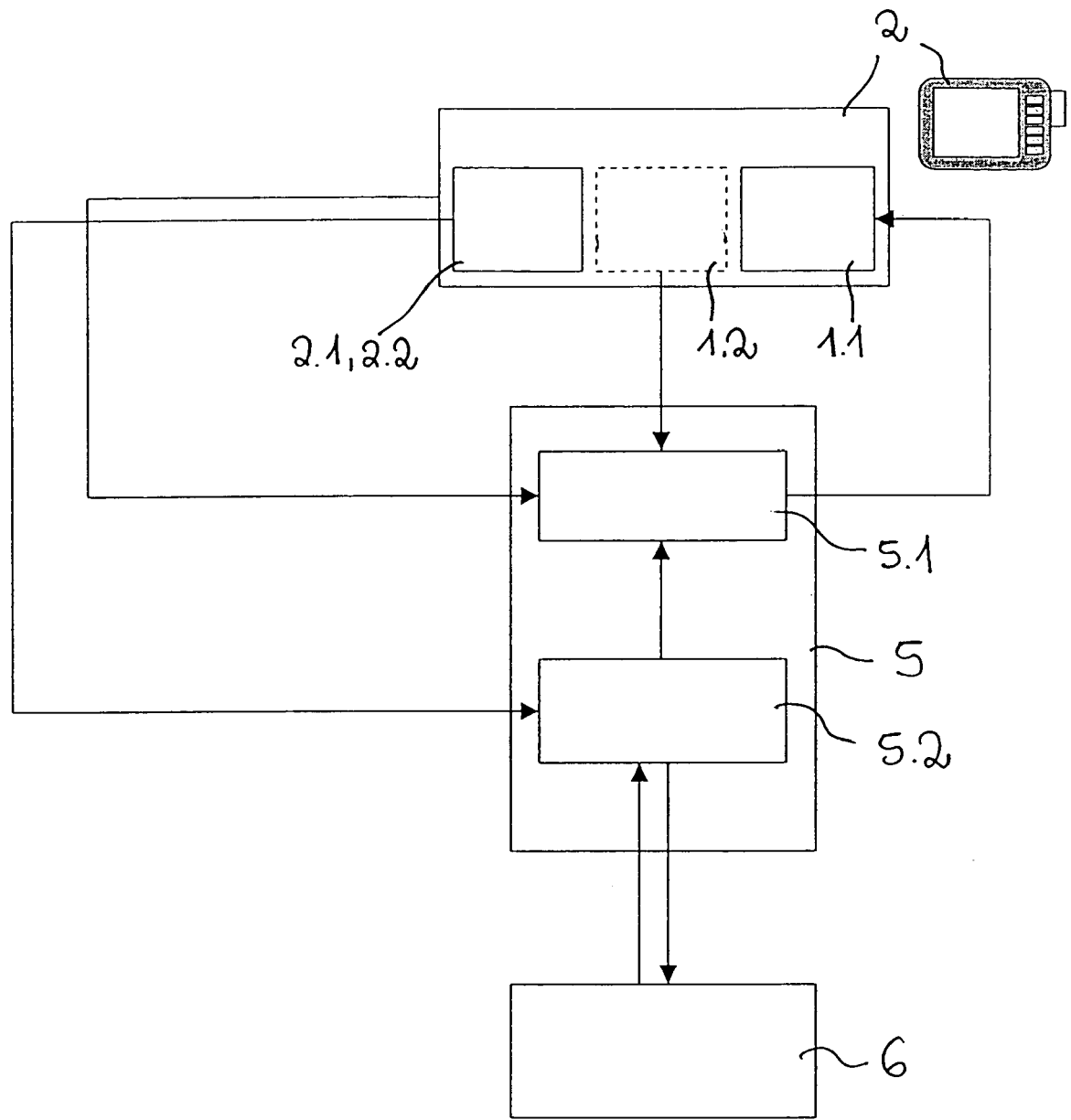
Figure 6B:
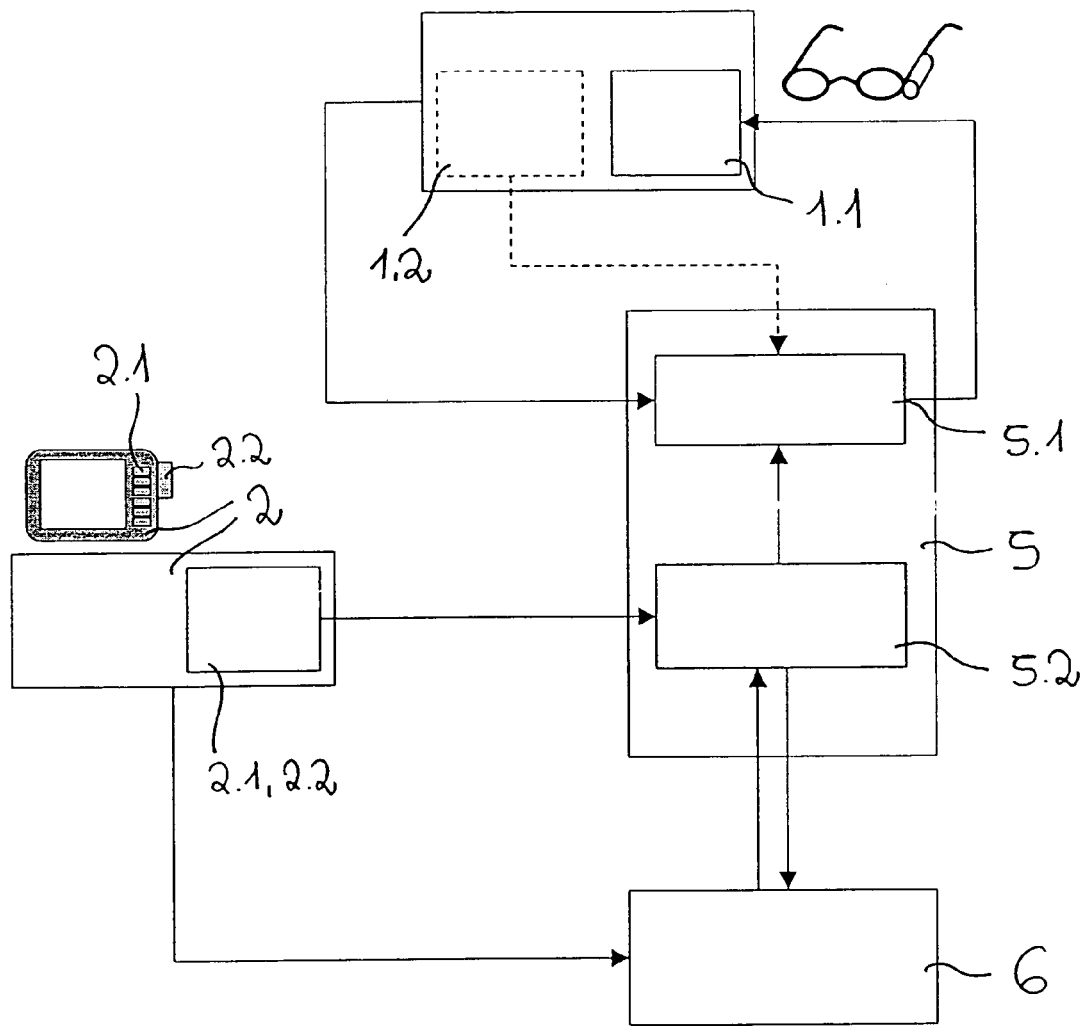
FIG. 6b Is a block diagram of the device according to the invention corresponding to the embodiment according to FIG. 3.

FIGS. 6 to 6b show the structure of the inventive device for fading in robot-specific, computer-generated information into an image of the real environment and the sequence according to the invention is readily apparent therefrom.

The inventive device 1 has a processing unit 5 for processing robot-specific, computer-generated information for the purpose of displaying the same on the viewing device 1.1. To the processing unit 5 can be connected a camera 1.2, as shown in broken line form in FIG. 4, which records an image of the real environment and supplies it to the processing unit 5. Within the processing unit 5 there is an image generating unit 5.1, with evaluates the pose of the viewing unit 1.1 in accordance with the camera 1.2 and mixes the camera image with the robot-specific, computer-generated information, so that the real image and the information to be displayed are jointly displayed on the viewing device 1.1.

For this purpose the processing unit 5 has a manipulating unit 5.2, a robot control 6 having data interfaces for controlling at least one robot and obtaining therefrom robot-specific information, which together with the image of the real environment are displayed on the viewing device 1.1. The processing unit 5 can also incorporate an interface for input devices, such as e.g. a manual programmer for a robot, which allow a spatial manipulation of the robot-specific information by means of a human user. By means of the device according to the invention, robot-specific information, optionally whilst taking account of user inputs, are used in augmented reality models, which are in turn further processed by the image generating unit 5.1 for displaying the augmented image on the viewing device 1.1. Changing robot data, optionally due to user inputs, can be returned by the model manipulating unit 5.2 to the robot control 6. A user input for the spatial manipulation of AR data is designated 5.3.

The processing unit 5 can be integrated into either the viewing device 1.1, a manual programmer 2 or the robot control 6. It can fundamentally also form its own physical unit. The processing unit 5 can also be spatially subdivided, e.g. in that the image generating unit 5.1 is located in the viewing device 1.1 or a manual programmer 2, whereas the model manipulating unit 5.2 can be housed in the robot control 6. The processing unit 5 or parts thereof can be combined into a central system for different robots and optionally communication paths can pass via the Internet.

FIG. 6 shows a basic case and from it are derived in FIGS. 6a and 6b special cases for hand-held or spectacle-like viewing devices. The general architecture represents the points in common between the two specific architectures described hereinafter.

In the construction according to FIG. 6a the viewing device 1.1 is connected to or integrated into a manual programmer 2 in accordance with FIGS. 1a, 1b, 2a and 2b. It is provided with a camera 1.2 and input elements 2.1, 2.2 (keys, 6D mouse). The camera 1.2 is able to determine its position and therefore that of the viewing device 1.1 in the manner described, whilst by means of the input elements 2.1, 2.2 inputs for manipulating robot data can be inputted by the human user. Otherwise the construction according to FIG. 5 corresponds to that of FIG. 4.

FIG. 6 shows the block diagram concerning the inventive device of FIG. 2. The viewing device 1.1 is integrated into augmented reality spectacles, which can also be equipped with a camera 1.2. The spectacles can be of the see-through type, in which the real world is perceived directly and not via a camera image and only the computer-generated information is faded in. Apart from a spatial input element, e.g. a manual programmer 2 with input keys 2.1 and/or a 6D mouse 2.2, a spatial viewing device 1.1 is provided in physically separated form. Otherwise the block diagram of FIG. 6 corresponds to that of FIG. 4.

The input device in the form of a manual programmer 2, also to the extent that it acts as a viewing device 1.1, can also be provided in a different construction, e.g. a different input device and a different viewing device can be provided and in particular the latter was described in this connection hereinbefore.

FIGS. 7a to 7c show possible representations on the viewing device 1.1 with areas of the real environment, such as in particular a robot 7 or a workpiece 8 being machined by it, as well as robot-specific, computer-generated information faded into this image of the real environment and connected thereto. It is possible with the image of a real robot 7 with a tool 7.1, such as welding tongs, to generate coordinate systems to be associated therewith, such as the stationary world coordinate system K1 with the coordinates X+, Y+, Z+. The coordinate system K+ is a world coordinate system displaced in parallel into the TCP with displaced coordinates X'+, Y'+, Z'+. The origin of the world coordinate system K1 is at the intersection of the axis of symmetry of the base 7a of the robot 7 with the background and the origin of the coordinate system K2 is in the center of the hand flange or, when a tool is present, is displaced into the tool center point. Through the representation of coordinate systems, assistance is obtained in manual cartesian movements of the robot, particularly by means of the displacement key on the programmer (FIG. 7a).

The black arrow V in FIG. 7a by its direction and length visualizes the movement direction and speed with which the robot was moved if it was ready to move, for as long as it is not ready to move (drives not on, permission key not depressed). If the robot moves, the arrow V visualizes the actual movement direction and speed of the robot system.

In order to facilitate the drawing up, adaptation or testing of robot programs, the workpiece 8 to be machined can be visualized in computer-generated manner in association with the image of a real robot 7. The simulated component 8' then forms the reference during the drawing up, adaptation and testing of the robot program. The use of a simulated component 8' can also be advantageous if the real component 8 is bulky or hinders the free movement of the user 4 in the plant (FIG. 7b).

FIG. 7c shows the fading in of a tool coordinate system K3 with the coordinates $X_3+$, $Y_3+$, $Z_3+$ as AR assistance in manual cartesian movement.

The tool or workpiece can be measured by manipulating the reference coordinate system. The sequence is similar to the manipulation of targets of path movements, as described relative to FIG. 5. The reference coordinate system is shifted and rotated in space under the visual control of the user until it is in the desired position relative to the workpiece (when measuring a basic coordinate system) or the tool (when measuring a tool coordinate system).

If a robot path is to be programmed or modified and no real workpiece is available, according to the invention in place of this it is possible to operate with an augmented workpiece. A user teaches the points by manual movement of the robot on the augmented workpiece and not on the real workpiece. In the same way as when a workpiece is present, it is also possible to augment absent plant components in order to e.g. fix the robot path in such a way that following installation of the plant components no collisions occur. The manual movement of the robot in a space into which are faded (almost) only augmented objects is simpler, because there is no need to take account of robot collisions with real objects and the user can move unhindered in space. The augmented objects are here of a static nature.

If no real workpiece is present the visualization of the workpiece by AR can possibly provide valuable additional information to the user as to which movement instructions of the robot belong to a specific machining process (in that possibly very complex robot paths are visualized, so that a survey is difficult).

The visualization of the augmented workpiece reveals to the user the workpiece from which the robot is starting. If a robot machines several workpieces with different programs, the comparison between the real and augmented workpiece provides the user with a simple possibility of veryfying the choice of the correct machining program (in this connection see the description of FIG. 13).

The augmented workpiece indicates to the user at which point the robot assumes the workpiece to be. If the robot program path does not correspond to the position of the real workpiece (e.g. due to positional tolerances), the user can correct the robot program in that the user shifts and rotates the augmented workpiece together with the associated robot program path points until coincidence with the real workpiece is obtained. The manipulation can take place in the manner described hereinbefore.

In the last three application cases described the visualization of the workpiece by AR represents additional information for augmented path patterns of the robot program. The augmentation of the workpiece is dependent on the robot path (its position changes e.g. due to the shifting of the corresponding workpiece coordinate system). Consequently this represents dynamic, manipulatable, robot-specific information.

Figure 8:
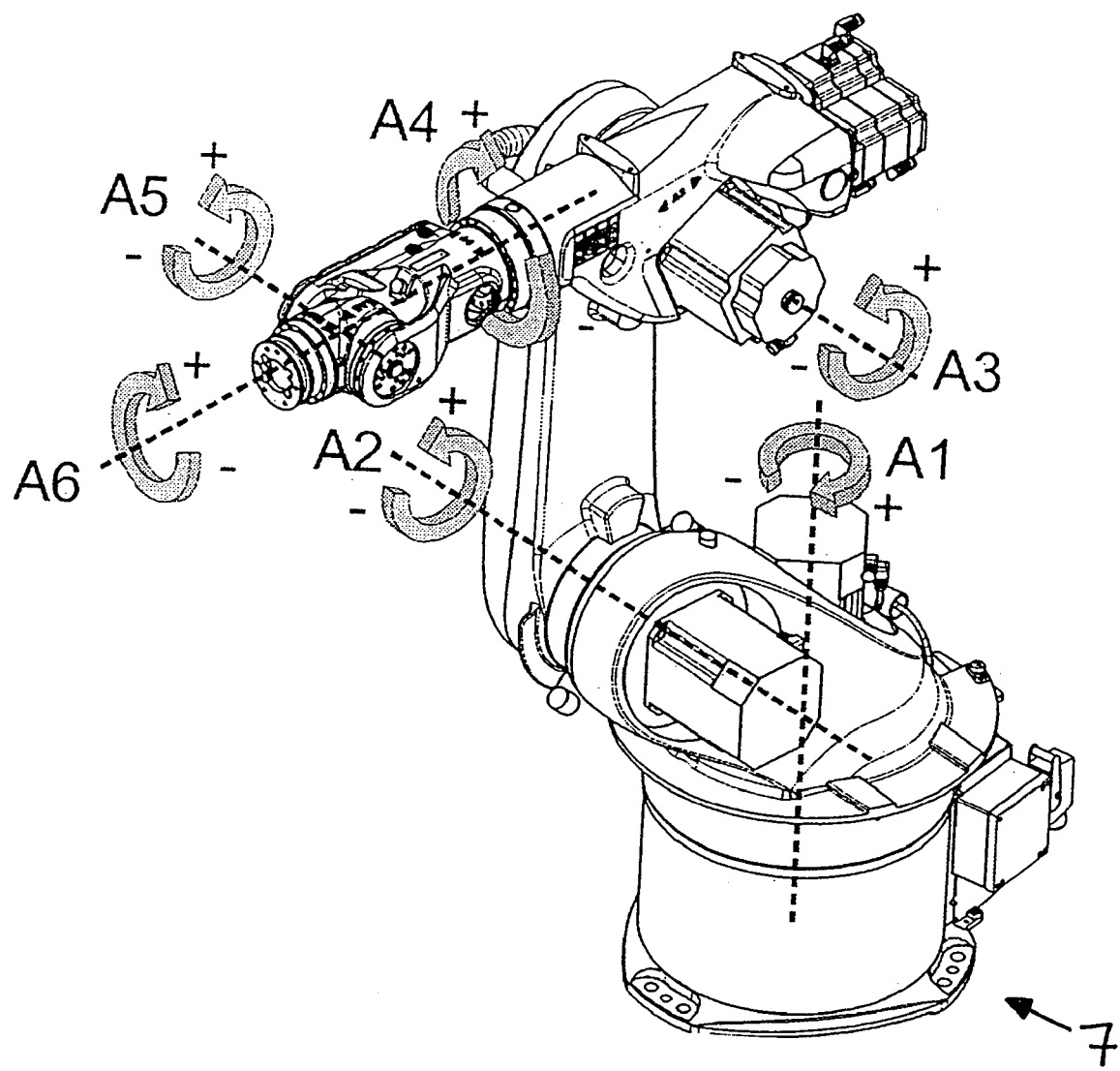

For assistance in the case of a manual axis-specific movement of a robot, particularly with the movement keys on the programmer, additionally and instead of a coordinate system the axes A1 to A6 of the robot can be displayed, i.e. they are so faded into the image of the real robot 7 that they coincide with its actual axes in the image. In addition, positive and negative rotation directions about the corresponding axes can be displayed (FIG. 8). The visualization of the axes can also be helpful for manual Cartesian movements in order to indicate to the user in the vicinity of singular joint configurations that one or more axes will soon arrive at the limits of their maximum acceleration or speed.

Figure 9:
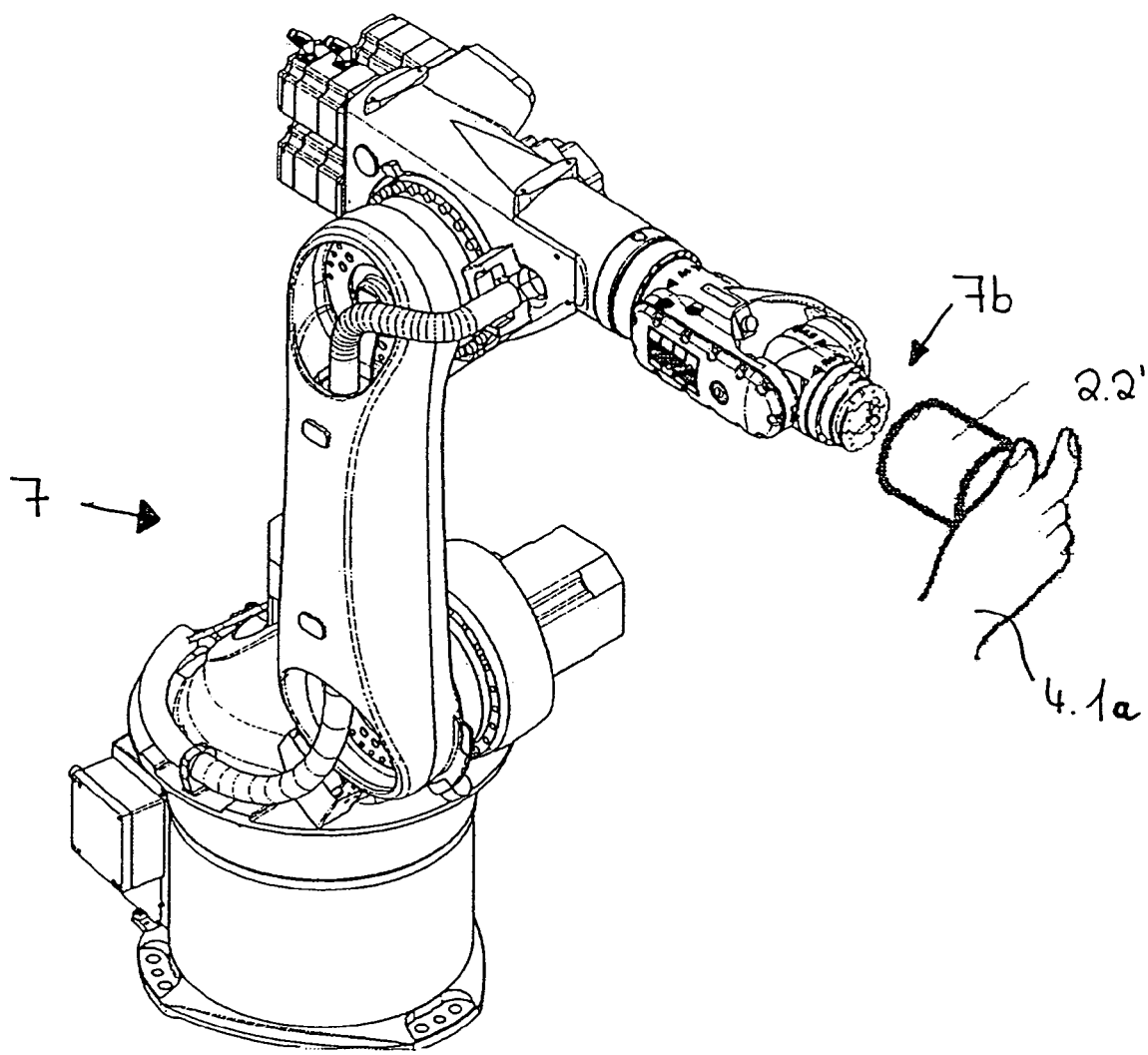

In addition, manual movement more particularly by means of the 3D mouse 2.2 can be facilitated in that this is faded directly upstream of the hand flange 7b or TCP of a robot 7 into the image thereof as a virtual 3D mouse 2.2'. It is additionally possible to also fade in the virtual hand 4.1a of a user (FIG. 9).

Figure 10:
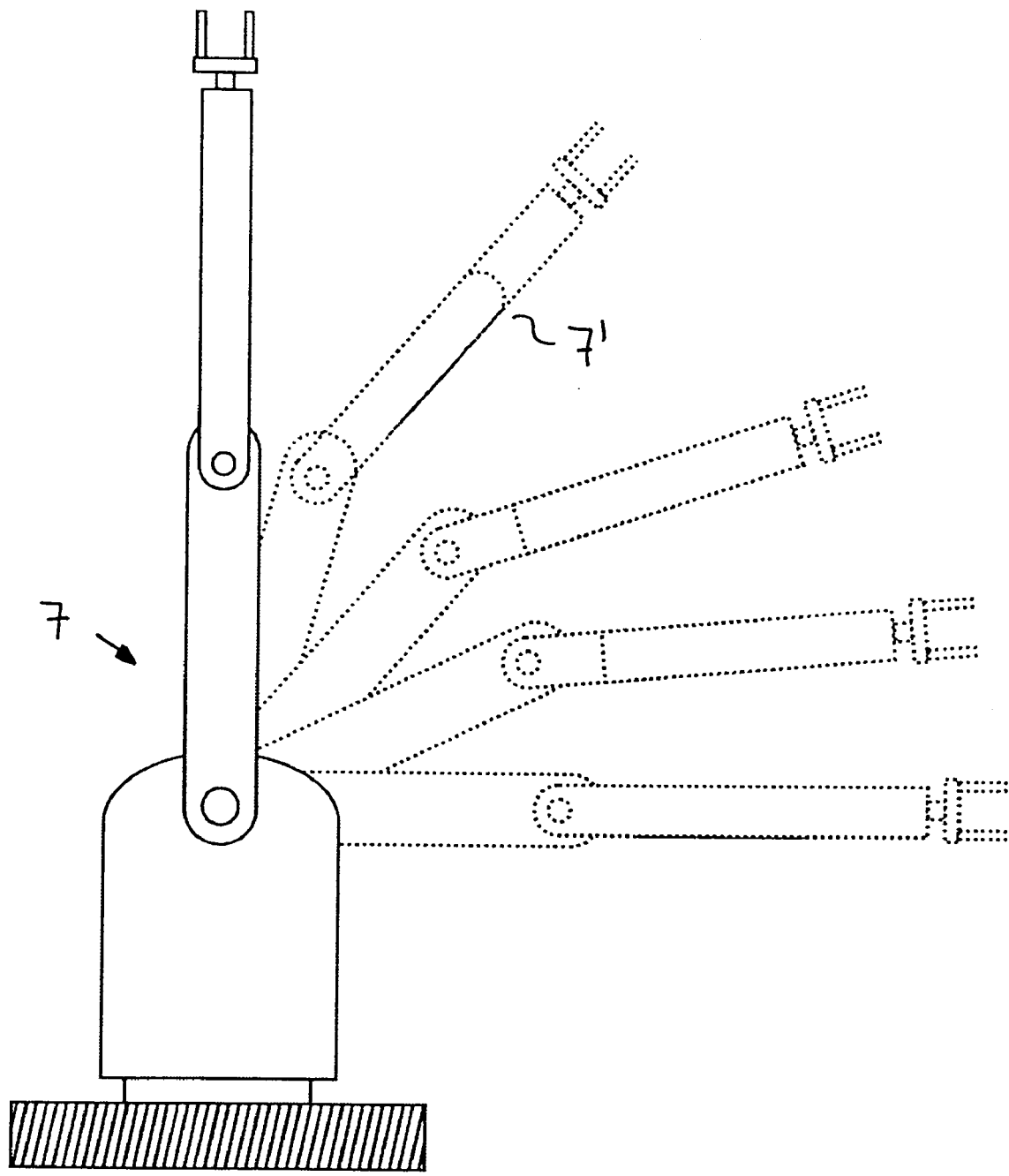

FIG. 10 shows the image of a real robot 7 together with computer-generated, further positions 7' and parts of the robot, namely rocker, robot arm and robot hand, in different positions, so that total operating areas and the like are illustrated and therefore programming of an operating sequence of the robot can be facilitated, because for the teaching of path points and the checking of a programmed path of the robot there is no need to move, so that time is saved and the danger of injury and damage is reduced.

It is also possible, together with the image of a real robot 7 and passing through its hand flange 7b or TCP, to fade in a computer-generated robot operating path, optionally together with specific, alphanumerically designated points P1 to P6 of the path and path speeds in certain areas, such as areas between two points and finally also alphanumeric, functional details, such as in the embodiment shown the opening and closing of a gripper (open gripper, close gripper) at the path points P4 and P5 (FIG. 11).

In addition to the alphanumerical informations, it is also possible to visualize symbols or the orientation of the tool in specific path points.

Figure 12:
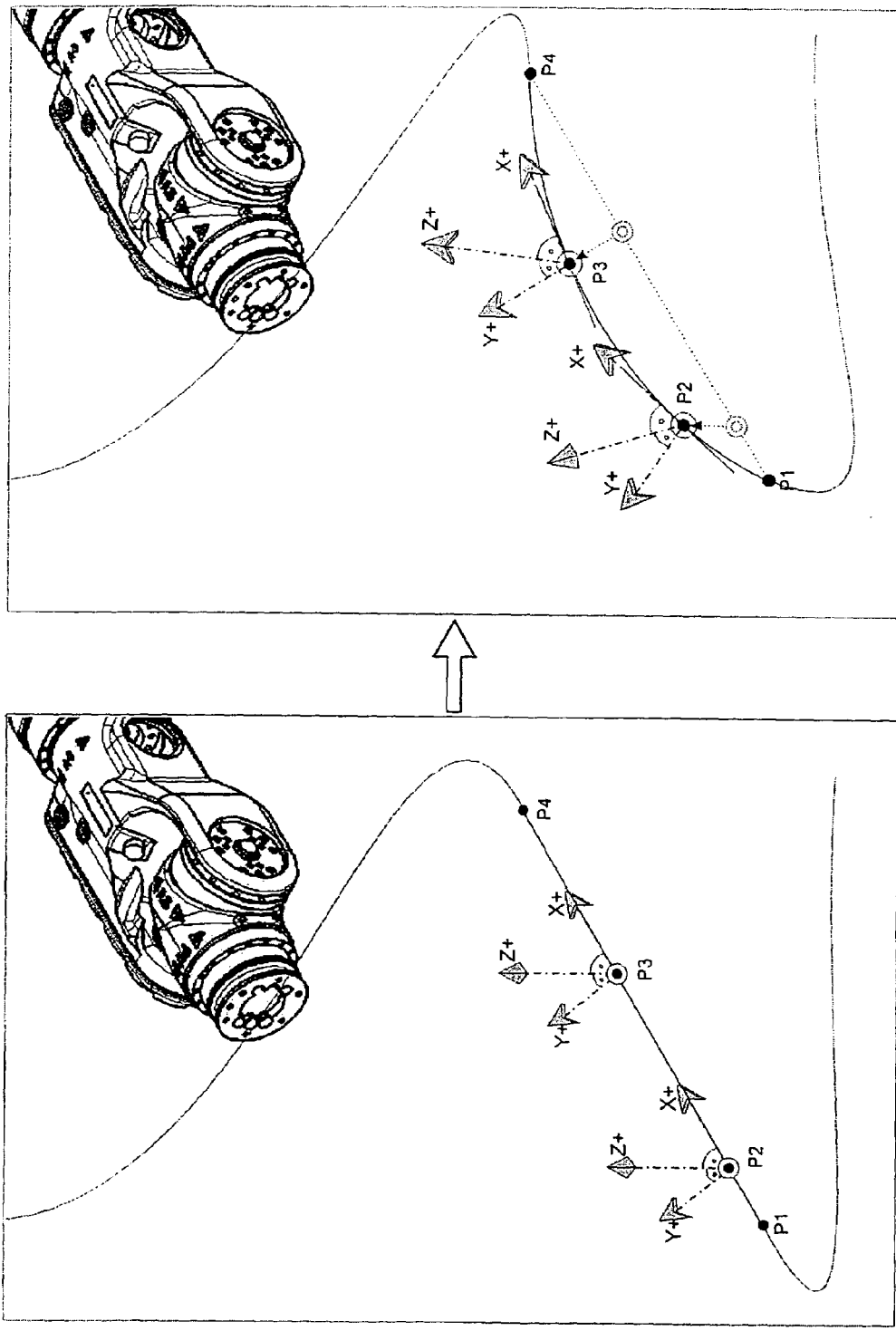

For the adaptation of existing robot programs the path points can be directly, individually or groupwise displaced and rotated in space, in the manner shown in FIG. 12, the provision of new path points or also complete new program or path sequences also being directly visualizable, as explained relative to FIG. 5.

Figure 13:
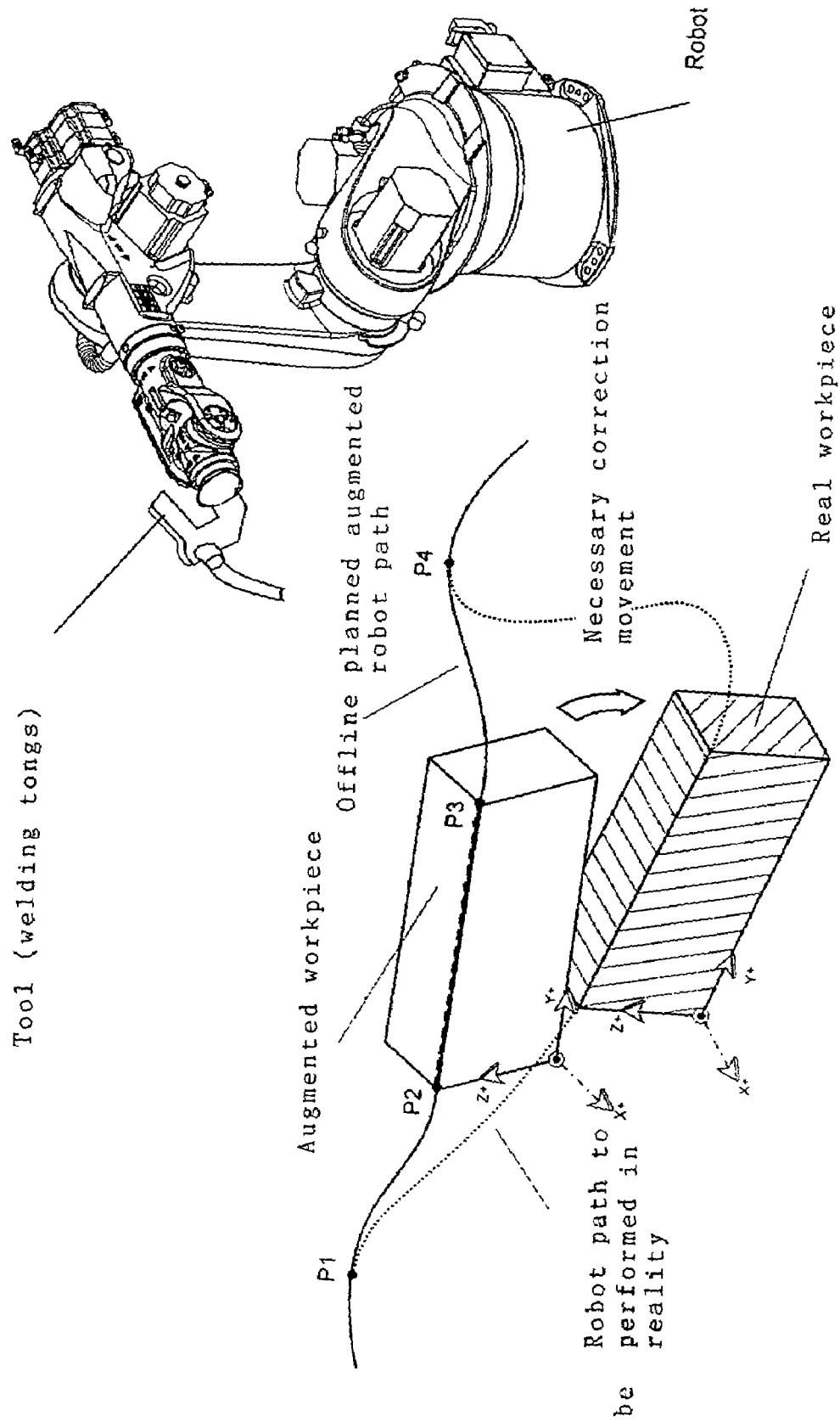

According to a further development, together with the image of the real component 8 a computer-generated component 8' can be visualized (FIG. 13). Thus, in the case of divergences in the component position, the position of groups of path points in the robot program can be corrected, in that the augmented workpiece 8' together with path points or the path of the robot relating thereto can be displaced and rotated until the augmented workpiece 8' coincides with the real workpiece 8.

Figure 14:
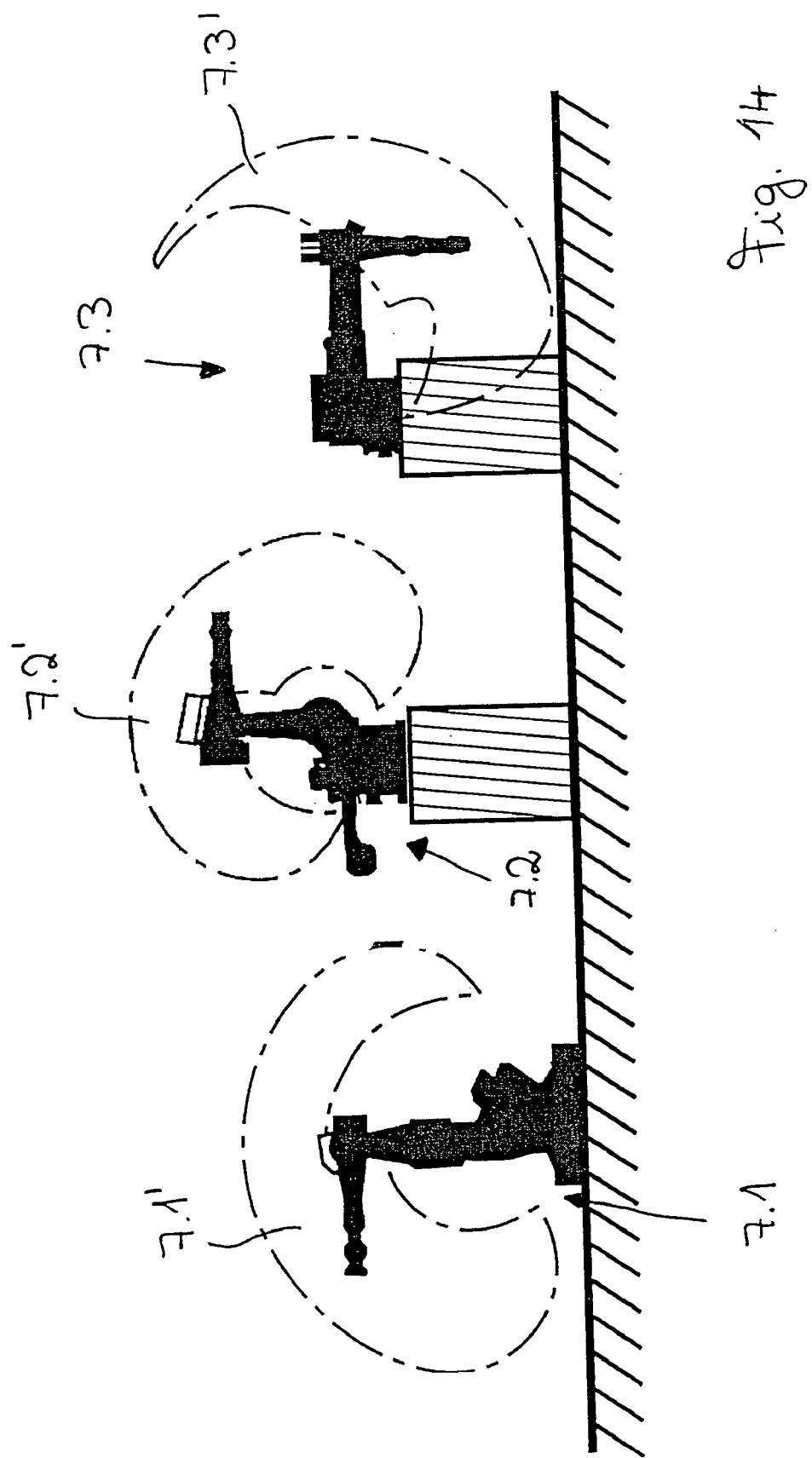

It is also possible to visualize and interactively adapt operating areas of a real plant comprising several robots. FIG. 14 shows the real image of three cooperating robots 7.1, 7.2, 7.3 together with the computer-generated representation of their total operating areas 7.1', 7.2', 7.3'.

The visualization of the attainable total operating area of a robot system can be advantageous for detecting possible collision zones of closely juxtaposed robot systems. The direct application or adaptation of the robot path is consequently effectively assisted by the visualization of the attainable operating area.

It is also possible to visualize and adapt areas which the robot must not penetrate or must not leave. These can also be operating areas which are jointly used by several robot systems or other plant components, so that their use can be managed. Virtual fixtures, which are used in the manually guided operation of robot systems can be easily fixed, visualized and adapted. The types of operating areas can in each case be defined by the programmer or automatically fixed by corresponding software. The defined operating area can in each case relate to a defined point of the robot structure, preferably the TCP or alternatively the outer contour of the robot or part thereof.

Figure 15:
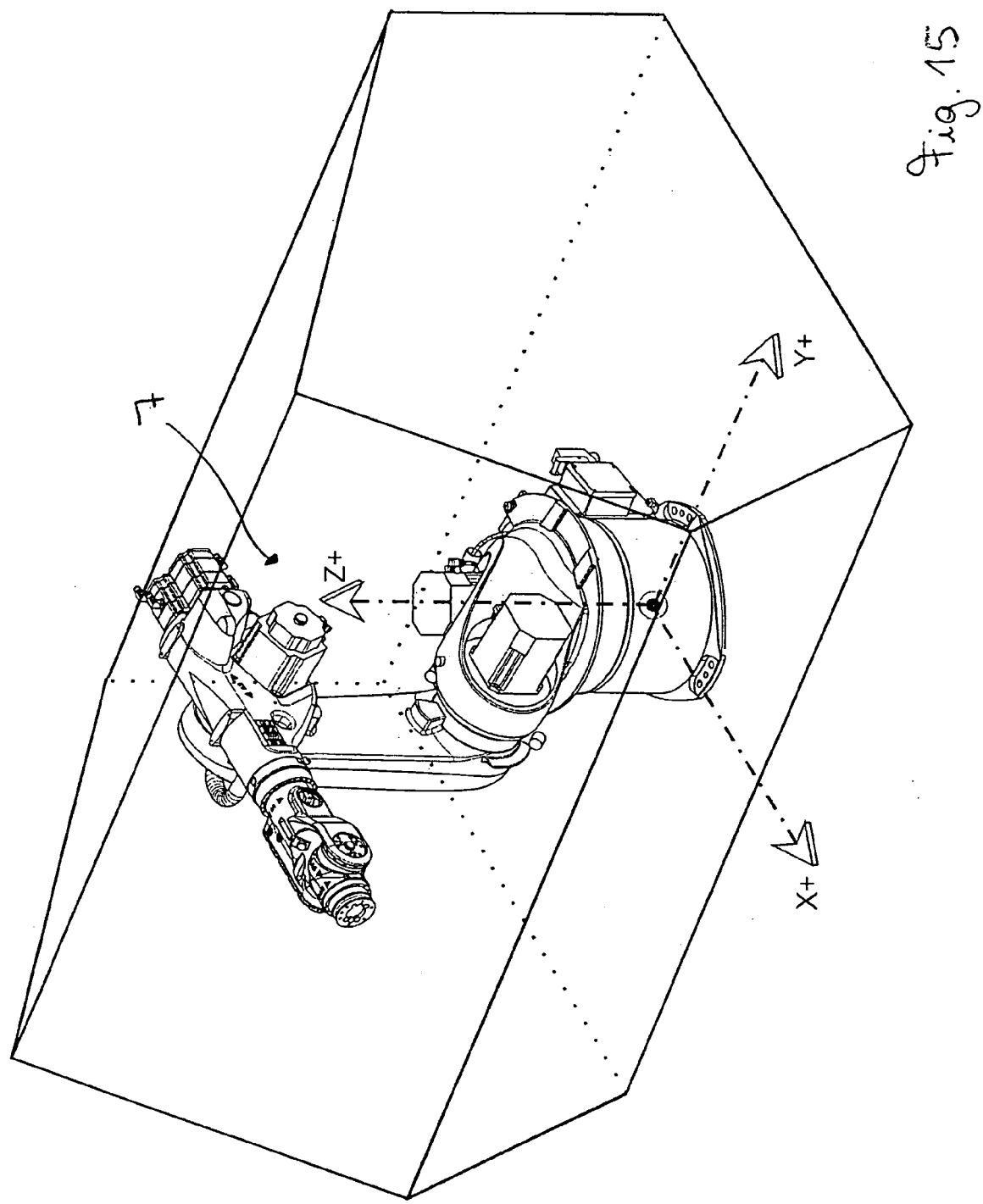
Figure 16:
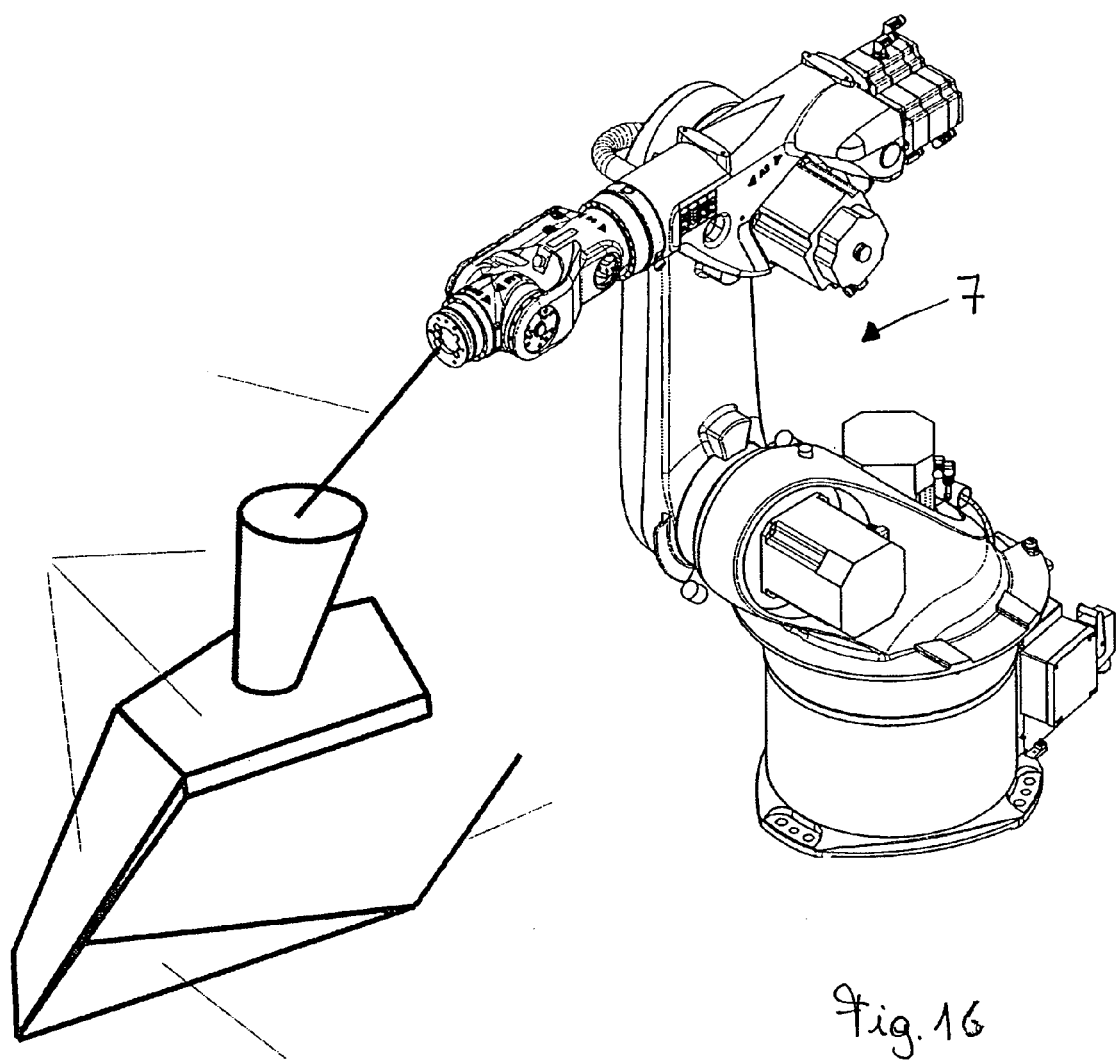
Figure 17:
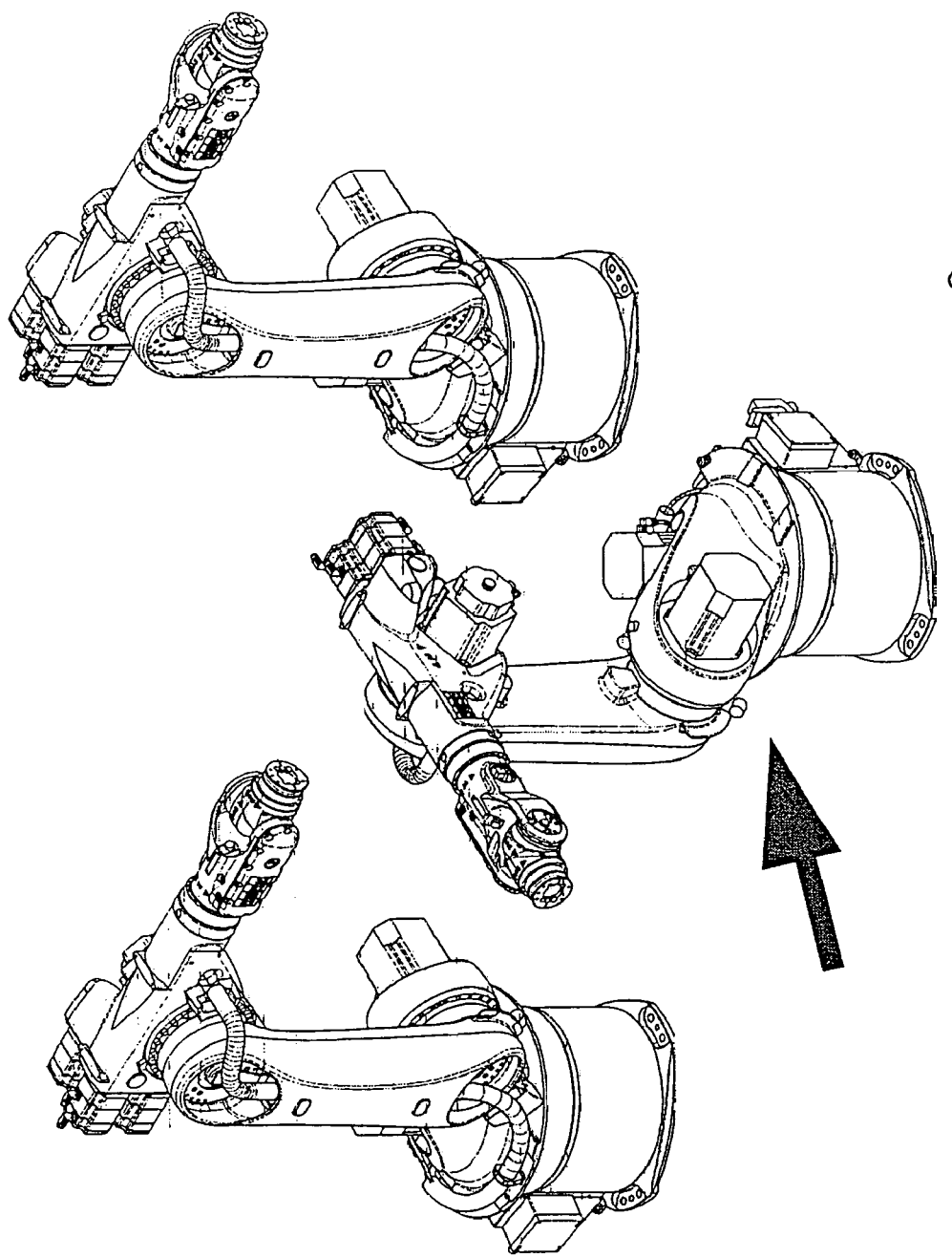

The visualization of an operating area can e.g. take place by fading in a body of the same size and geometry corresponding to the operating area (FIG. 15). The visualization of virtual fixtures or guidance corridors can take place in a similar way and use can be made of three, two or one-dimensional bodies, as shown in FIG. 16. It can alternatively be advantageous to visualize an equivalent mechanical structure, which incorporates a corresponding restriction of the movement possibilities, such as the visualization of guide rails, joint mechanisms, etc.

To adapt visualized operating areas it is possible to individually correct in space corner or auxiliary points. It is alternatively possible to adapt operating areas in that their lateral faces are individually displaced and rotated, as described relative to FIGS. 4a to 4c.

The inventive AR visualization of operating areas and virtual fixtures assists the user in fixing the same, e.g. by the fading in of permitted and non-permitted operating volumes, as shown in FIGS. 15 and 16. During programming a possibility exists for manipulating the operating areas or virtual fixtures, e.g. via the "shifting" of corner points with the input elements on the manual programmer.

Figure 17:
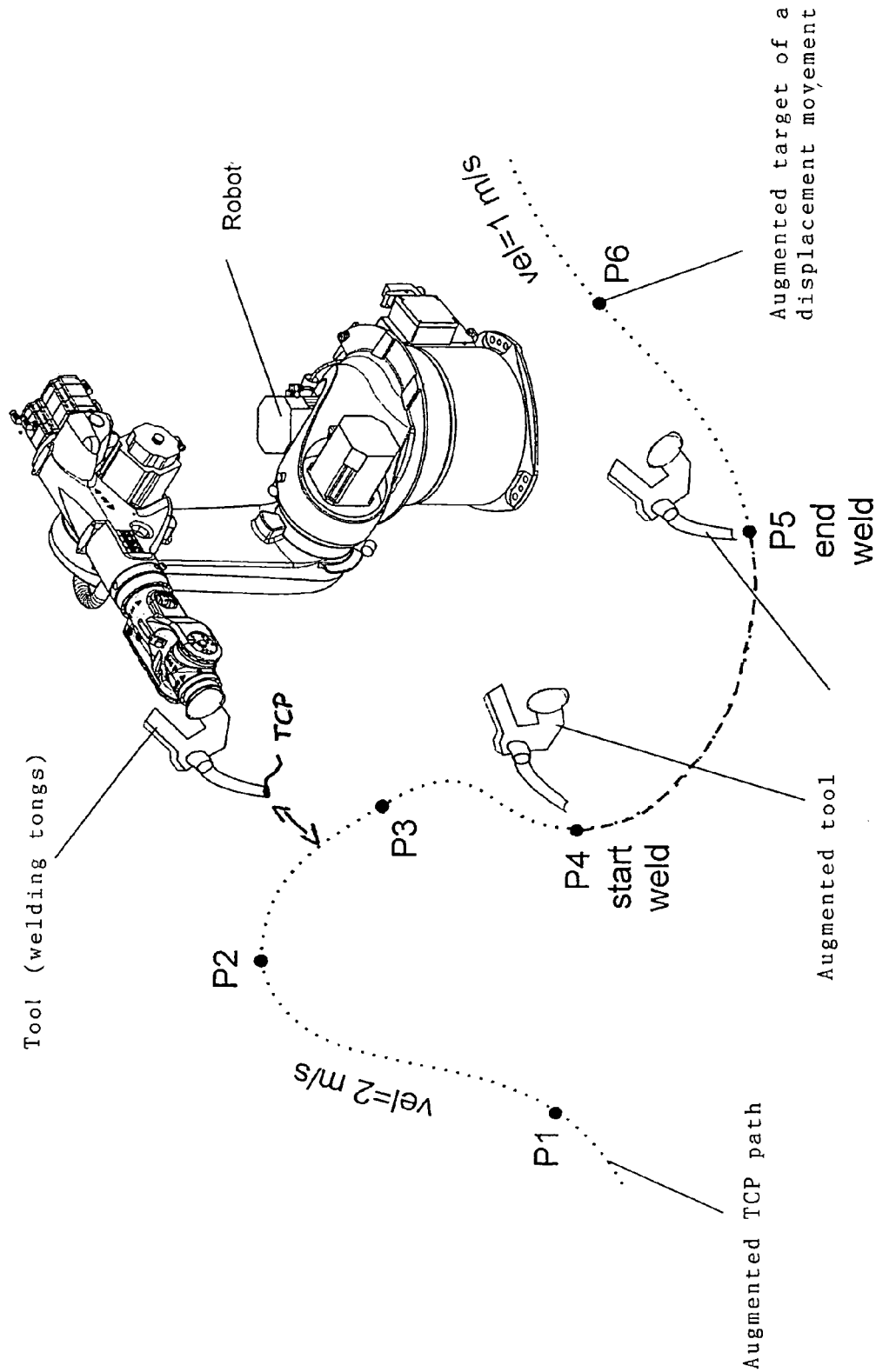

If several robots can be successively programmed with a single manual programmer, it is possible to mark the programmer-associated robots, e.g. by a graphic element such as an arrow or the like (FIG. 17). This is also the situation if different robots can be successively or simultaneously controlled by means of a manual programmer. Here again it is advantageous to make visually apparent to the user the robot presently associated with the manual programmer. It is additionally possible to select and deselect robot systems by the user contacting faded-in, virtual input elements or the programmer is oriented with the corresponding robot. The basic selectability of a robot or its lack of usability e.g. if the robot does not belong to the group of robots which can be controlled by a given manual programmer, can be indicated directly to the user on the image of the real robot by a corresponding marking or designation. It is also possible to visualize and if necessary modify the actual state of robot systems, such as the selected operating mode, state of the drives (on, off) or the like.

While specific embodiments of the invention have been shown and described in detail to illustrate the application of the principles of the invention, it will be understood that the invention may be embodied otherwise without departing from such principles.

The invention claimed is:

1. A method for superimposing computer-generated information into an image of the real environment detected by an image receiving unit located on a viewing device, the method comprising the steps of:
providing a robot;

providing a control unit;

providing the viewing device with the image receiving unit;

detecting an image of the real environment and detecting an image of the robot by the image receiving unit;

displaying said robot image and said real environment image on said viewing device;

obtaining a position and an orientation or pose of said robot based on said robot image and said real environment image detected via the image receiving unit;

obtaining robot-specific information from said robot via said control unit, said robot-specific information corresponding to information necessary for moving said robot;

superimposing the robot-specific information over the image of said robot on said viewing device, at least one robot-specific coordinate system being superimposed into said image of the robot and real environment; and controlling said robot based on said robot-specific information superimposed over image of said robot such that movement of said image corresponds to movement of said robot.

2. The method according to claim 1, wherein said robot-specific image includes a hand flange-fixed coordinate system.

3. The method according to claim 1, wherein said robot-specific information includes robot axes.

4. The method according to claim 1, wherein an image of a control element is superimposed on said robot image, said control element being movable in at least two dimensions for robot manually programmed movement.

5. The method according to claim 4, wherein an image of the control unit in association and orientation of the robot hand flange is superimposed on said robot image.

6. The method according to claim 1, wherein at least one tool moved by a robot, preferably several robot elements are superimposed into said real environment.

7. The method according to claim 1, wherein said robot-specific information includes a robot path to be covered by said robot in connection with a working process, particularly that of the tool center point, optionally including additional information.

8. The method according to claim 1, wherein said robot-specific information includes path points, wherein the position of the path points in space is variable and in each case a robot path curve corresponding to the position of all the path points.

9. The method according to claim 1, wherein the image of a workpiece to be machined by a robot, optionally together with axes associated therewith is superimposed on said robot image.

10. The method according to claim 1, wherein for adapting a robot path to the position of a detected, real workpiece, a virtual image of the workpiece with a robot path adapted thereto is superimposed on said image of said real environment, so that by superimposing the virtual workpiece image with the image of the real workpiece it is possible to adapt the robot path to be performed to the position of the real workpiece.

11. The method according to claim 1, wherein a working area reachable by a robot and/or a permitted operating area is visualized on the viewing device.

12. The method according to claim 1, wherein movement corridors of a robot tool, robot hand and/or further robot elements are visualized on the viewing device.

13. The method according to claim 1, wherein permanent and/or instantaneous associations of at least one manual programmer of at least one robot are visualized.

14. The method according to claim 1, wherein the position and orientation of the display are detected by fixed markings in space.

15. The method according to claim 14, wherein the position and orientation of the viewing device are determined by radio.

16. The method according to claim 1, wherein the position and orientation of the viewing device are determined optically.

17. The method according to claim 1, wherein the robot-specific, computer-generated information is superimposed onto data spectacles to be worn by a user.

18. The method according to claim 1, wherein the robot-specific, computer-generated information is superimposed onto a transparent screen as the viewing device.

19. The method according to claim 1, wherein the robot-specific, computer-generated information is displayed together with optoelectronically recorded information on a graphicable screen as the viewing device.

20. The method according to claim 1, wherein the robot-specific, computer-generated information is displayed together with optoelectronically recorded information on a screen in the form of a graphicable screen of a manual programmer for a robot.

21. The method according to claim 1, wherein the robot-specific, computer-generated information is displayed together with optoelectronically recorded information on a graphicable screen as the viewing device connectable to a manual programmer for a robot.

22. The method according to claim 1, wherein said robot-specific information includes position of a tool center point frame, a tool contour, boundaries of a working space, axes of rotation of a plurality of robot articulations and travel speed of said robot.

23. A device for visualizing computer-generated information in an image of the real environment, the device comprising:

a robot;

an image receiving device;

a viewing device connected to said image receiving device, said image receiving device detecting an image of said robot and surrounding real environment of said robot, said viewing device displaying said robot image and said surrounding real environment;

a means for obtaining the position and orientation or pose of said robot based on said image of said robot and surrounding real environment of said robot detected via said image receiving device;

a control unit, said control unit receiving robot-specification information from said robot;

a means for superimposing said robot-specific information over said image of said robot and said surrounding real environment on said viewing device, said robot-specific information corresponding to information necessary for moving said robot, said control unit controlling said robot based on said robot-specific information superimposed on said image of said robot, whereby said robot is moved based on movement of said image of said robot.

24. The device according to claim 23, wherein said robot-specific information includes a hand flange-fixed coordinate system.

25. The device according to claim 23, wherein said robot-specific information includes robot axes.

26. The device according to claim 23, further comprising a display of the image of an operating unit of a robot manual programmer movable in at least two dimensions.

27. The device according to claim 26, further comprising a display of an image of the operating unit in association and orientation of the robot hand flange.

28. The device according to claim 23, further comprising a display of at least one tool moved by a robot and preferably several robot elements, in an operating environment of a robot.

29. The device according to claim 23, wherein said robot-specific information includes a robot path to be covered during an operating process and optionally with additional information for a robot, particularly the hand flange of a robot.

30. The device according to claim 23, wherein said robot-specific information includes path points with respect to a variability of the position of the path points in space and in each case a display of a position of a robot path curve corresponding to all the path points.

31. The device according to claim 23, further comprising a display of an image of a workpiece to be machined by a robot and optionally with axes associated therewith.

32. The device according to claim 23, wherein said robot-specific information includes a virtual image of a workpiece with a robot path adapted thereto for adapting the robot path to the position of a detected, real workpiece, so that by superimposing the virtual workpiece image with the image of the real workpiece it is possible to adapt the robot path to be performed to the position of the real workpiece.

33. The device according to claim 23, wherein said robot-specific information includes a display of an operating area reachable by a robot and/or a permitted operating area on the viewing device.

34. The device according to claim 23, further comprising a display of movement corridors of a robot tool, a robot hand and/or further robot elements on the viewing device.

35. The device according to claim 23, further comprising a display of permanent and/or instantaneous associations of at least one manual programmer with at least one robot.

36. The device according to claim 23, wherein said robot-specific information includes fixed markings in space for detecting the position and orientation of the display.

37. The device according to claim 36, wherein the markings are radio receivers, particularly transmitters.

38. The device according to claim 23, wherein the markings can be detected by an optical receiver.

39. The device according to claim 23, further comprising data spectacles to be worn by a user for displaying said robot-specific information and computer-generated information.

40. The device according to claim 23, further comprising a graphicable screen for displaying said robot-specific information and computer-generated information together with optoelectronically recorded information.

41. The device according to claim 23, further comprising a viewing device in the form of a graphicable screen of a manual programmer for a robot for displaying said robot-specific information and computer-generated information together with optoelectronically recorded information.

42. The device according to claim 23, further comprising a graphicable screen connectable to a manual programmer of a robot as a viewing device for displaying said robot-specific information and computer-generated information together with optoelectronically recorded information.

43. The device according to claim 23, wherein said robot-specific information includes position of a tool center point frame, a tool contour, boundaries of a working space, axes of rotation of a plurality of robot articulations and travel speed of said robot.

44. A method for superimposing computer-generated information, the method comprising:

providing a robot;

providing a control unit;

providing a viewing device;

providing an image receiving unit;

detecting an image of said robot and detecting an image of the real environment surrounding said robot via said image receiving unit;

displaying said image of said robot and said image of said real environment on said viewing device;

determining position of said robot based on said image of said robot and said image of said real environment;

obtaining robot-specific information from said robot via said control unit, said robot-specific information corresponding to one of a position of a tool center point frame, a tool contour, boundaries of a working space, axes of rotation of a plurality of robot articulations and travel speed of said robot;

superimposing said robot-specific information over said image of said robot and said image of said real environment; and controlling said robot based on said robot-specific information superimposed over image of said robot such that movement of said image of said robot corresponds to movement of said robot.

* * * * *